United States Patent
Branagan

(10) Patent No.: US 6,767,419 B1
(45) Date of Patent: Jul. 27, 2004

(54) METHODS OF FORMING HARDENED SURFACES

(75) Inventor: Daniel J. Branagan, Iona, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 344 days.

(21) Appl. No.: 09/709,918

(22) Filed: Nov. 9, 2000

(51) Int. Cl.$^7$ .............................. C22C 1/00; C22C 9/00
(52) U.S. Cl. ...................... 148/522; 148/525; 148/527; 148/529; 148/530; 148/537; 148/561
(58) Field of Search ................................ 148/522, 525, 148/527, 529, 530, 537, 561

(56) References Cited

U.S. PATENT DOCUMENTS

| | | |
|---|---|---|
| 4,725,512 A | 2/1988 | Scruggs |
| 4,820,141 A | 4/1989 | Shingu et al. |
| 5,376,191 A * | 12/1994 | Roman et al. ............... 148/403 |
| 5,643,531 A * | 7/1997 | Kim et al. .................. 148/403 |
| 6,258,185 B1 * | 7/2001 | Branagan et al. ........... 148/561 |
| 6,261,386 B1 | 7/2001 | Perepezko et al. |
| 6,270,591 B2 | 8/2001 | Chiriac et al. |

* cited by examiner

*Primary Examiner*—Deborah Yee
(74) *Attorney, Agent, or Firm*—Wells StJohn Roberts Gregory & Matkin

(57) ABSTRACT

The invention encompasses a method of forming a metallic coating. A metallic glass coating is formed over a metallic substrate. After formation of the coating, at least a portion of the metallic glass can be converted into a crystalline material having a nanocrystalline grain size. The invention also encompasses metallic coatings comprising metallic glass. Additionally, the invention encompasses metallic coatings comprising crystalline metallic material, with at least some of the crystalline metallic material having a nanocrystalline grain size.

69 Claims, 18 Drawing Sheets

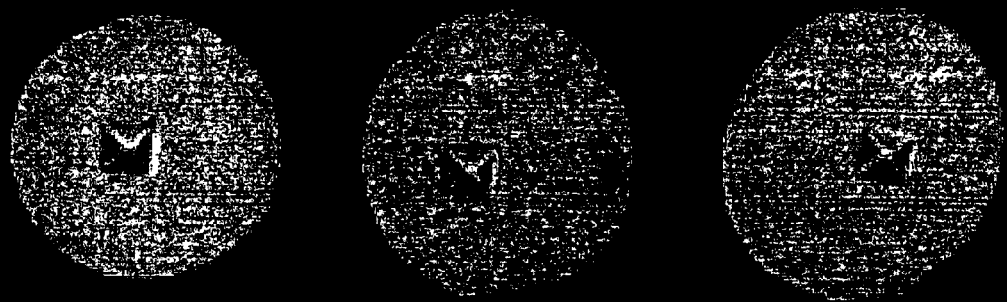
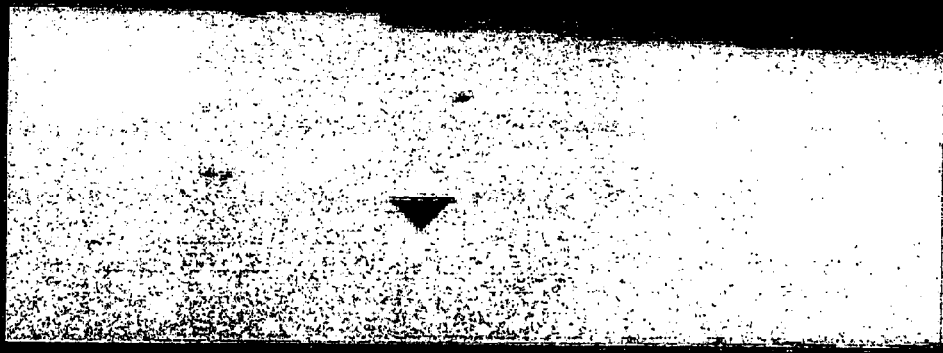
FIG. 12

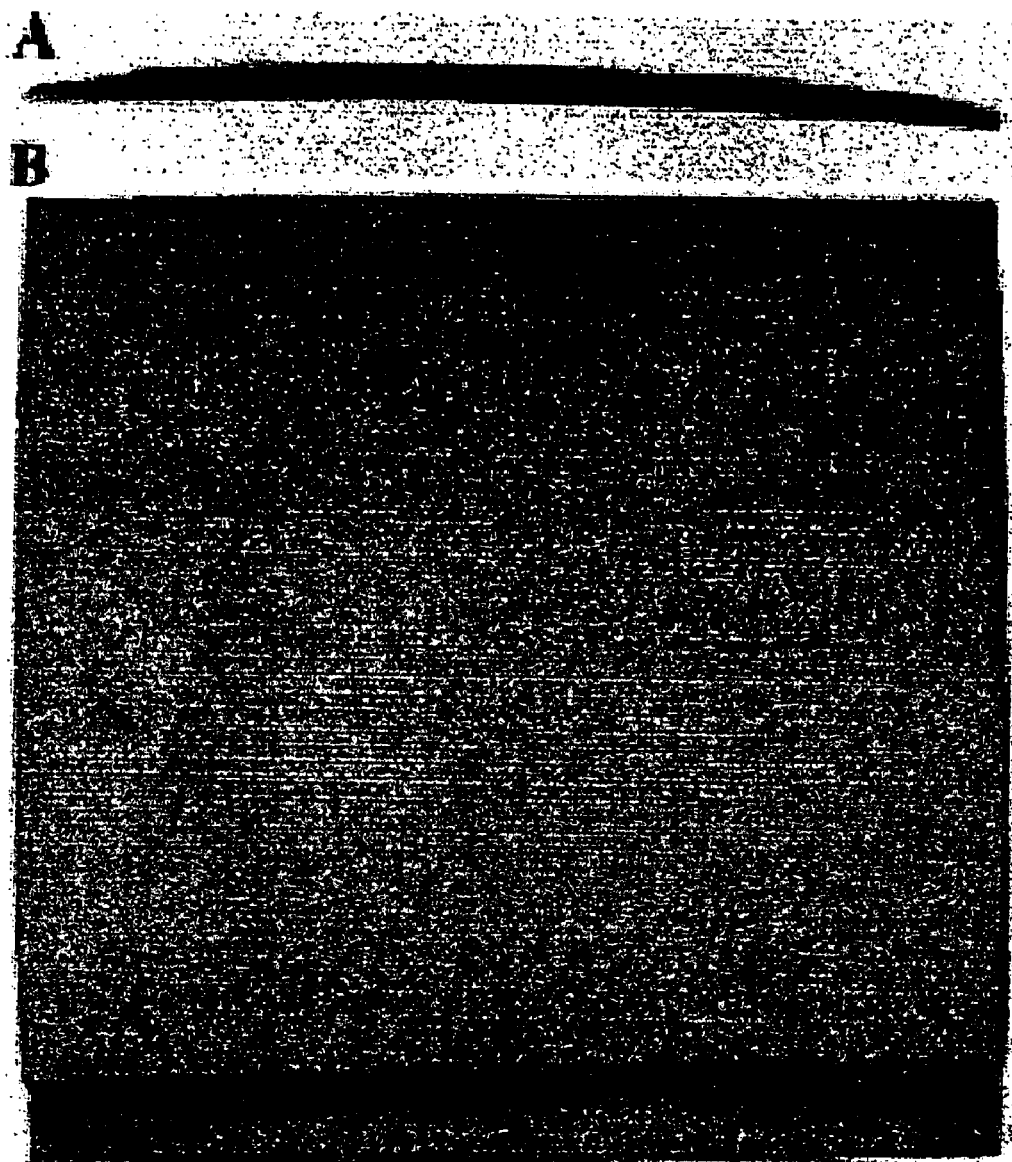

US 6,767,419 B1

METHODS OF FORMING HARDENED SURFACES

CONTRACTUAL ORIGIN OF THE INVENTION

This invention was made with United States Government support under Contract No. DE-AC07-99ID13727 awarded by the United States Department of Energy. The United States Government has certain rights in the invention.

TECHNICAL FIELD

The invention pertains to metallic coatings and methods of forming metallic coatings.

BACKGROUND OF THE INVENTION

Steel is a metallic alloy which can have exceptional strength characteristics, and which is accordingly commonly utilized in structures where strength is required or advantageous. Steel can be utilized, for example, in the skeletal supports of building structures, tools, engine components, and protective shielding of modern armaments.

The composition of steel varies depending on the application of the alloy. For purposes of interpreting this disclosure and the claims that follow, "steel" is defined as any iron-based alloy in which no other single element (besides iron) is present in excess of 30 weight percent, and for which the iron content amounts to at least 55 weight percent, and carbon is limited to a maximum of 2 weight percent. In addition to iron, steel alloys can incorporate, for example, manganese, nickel, chromium, molybdenum, and/or vanadium. Steel alloys can also incorporate carbon, silicon, phosphorus and/or sulfur. However, phosphorus, carbon, sulfur and silicon can be detrimental to overall steel quality if present in quantities greater than a few percent. Accordingly, steel typically contains small amounts of phosphorus, carbon, sulfur and silicon.

Steel comprises regular arrangements of atoms, with the periodic stacking arrangements forming 3-dimensional lattices which define the internal structure of the steel. The internal structure (sometimes called "microstructure") of conventional steel alloys is always metallic and polycrystalline (consisting of many crystalline grains).

Steel is typically formed by cooling a molten alloy. The rate of cooling will determine whether the alloy cools to form an internal structure that predominately comprises crystalline grains, or, in rare cases, a structure which is predominately amorphous (a so-called metallic glass). Generally, it is found that if the cooling proceeds slowly (i.e., at a rate less than about $10^4$ K/s), large grain sizes occur, while if the cooling proceeds rapidly (i.e., at a rate greater than or equal to about $10^4$ K/s) microcrystalline internal grain structures are formed, or, in specific rare cases amorphous metallic glasses are formed. The particular composition of the molten alloy generally determines whether the alloy solidifies to form microcrystalline grain structures or an amorphous glass when the alloy is cooled rapidly. Also, it is noted that particular alloy compositions (not iron based) have recently been discovered which can lead to microscopic grain formation, or metallic glass formation, at relatively low cooling rates (cooling rates on the order of 10 K/s).

Both microcrystalline grain internal structures and metallic glass internal structures can have properties which are desirable in particular applications for steel. In some applications, the amorphous character of metallic glass can provide desired properties. For instance, some glasses can have exceptionally high strength and hardness. In other applications, the particular properties of microcrystalline grain structures are preferred. Frequently, if the properties of a grain structure are preferred, such properties will be improved by decreasing the grain size. For instance, desired properties of microcrystalline grains (i.e., grains having a size on the order of $10^{-6}$ meters) can frequently be improved by reducing the grain size to that of nanocrystalline grains (i.e., grains having a size on the order of $10^{-9}$ meters). It is generally more problematic to form grains of nanocrystalline grain size than it is to form grains of microcrystalline grain size. Accordingly, it is desirable to develop improved methods for forming nanocrystalline grain size steel materials. Further, as it is frequently desired to have metallic glass structures, it is desirable to develop methods of forming metallic glasses.

SUMMARY OF THE INVENTION

In one aspect, the invention encompasses a method of forming a metallic coating. A metallic glass coating is formed over a metallic substrate. After formation of the coating, at least a portion of the metallic glass can be converted into a crystalline material having a nanocrystalline grain size.

In another aspect, the invention encompasses metallic coatings comprising metallic glass.

In yet another aspect, the invention encompasses metallic coatings comprising crystalline metallic material, with at least some of the crystalline metallic material having a nanocrystalline grain size.

BRIEF DESCRIPTION OF THE DRAWINGS

Preferred embodiments of the invention are described below with reference to the following accompanying drawings.

FIG. 12 shows examples of Vickers hardness tests using a diamond pyramid indenter. Specifically, a top portion of the figure shows the test relative to gas atomized powder particles, and a lower portion shows the test utilized for a melt-spun ribbon. The tested composition was $Fe_{63}Cr_8Mo_2B_{17}C_5Si_1Al_4$.

FIG. 13 is an optical micrograph of a steel composition which has been plasma sprayed onto a stainless steel substrate. The plasma-sprayed steel composition comprises $Fe_{63}Cr_8Mo_2B_{17}C_5Si_1Al_4$. The top portion of FIG. 9(a) is a cross-sectional view of the sprayed material, and the lower portion (b) shows a top surface of the coated material.

FIG. 14 illustrates an x-ray diffraction scan of a plasma-sprayed deposit having a free surface. The plasma-sprayed composition was $Fe_{63}Cr_8Mo_2B_{17}C_5Si_1Al_4$.

FIG. 20 shows the alloy $Fe_{63}Cr_8Mo_2B_{17}C_5Si_1Al_4$ as 1, $(Fe_{0.85}Cr_{0.15})_{83}B_{17}$ as 2, $(Fe_{0.8}Cr_{0.2})_{83}B_{17}$ as 3, $(Fe_{0.75}Cr_{0.25})_{83}B_{17}$ as 4, $(Fe_{0.8}Mo_{0.2})_{83}B_{17}$ as 5, $(Fe_{0.6}Co_{0.2}Cr_{0.2})_{83}B_{17}$ as 6, $(Fe_{0.8}Cr_{0.15}Mo_{0.05})_{83}B_{17}$ as 7, $(Fe_{0.8}Cr_{0.2})_{79}B_{17}C_4$ as 8, $(Fe_{0.8}Cr_{0.2})_{79}B_{17}Si_4$ as 9, $(Fe_{0.8}Cr_{0.2})_{79}B_{17}Al_4$ as 10, $(Fe_{0.8}Cr_{0.2})_{75}B_{17}Al_4C_4$ as 11, $(Fe_{0.8}Cr_{0.2})_{75}B_{17}Si_4C_4$ as 12, $(Fe_{0.8}Cr_{0.2})_{75}B_{17}Si_4Al_4$ as 13, $(Fe_{0.8}Cr_{0.2})_{71}B_{17}Si_4C_4Al_4$ as 14, $(Fe_{0.7}Co_{0.1}Cr_{0.2})_{83}B_{17}$ as 15, $(Fe_{0.8}Cr_{0.2})_{76}B_{17}Al_7$ as 16, $(Fe_{0.8}Cr_{0.2})_{79}B_{17}W_2C_2$ as 17, $(Fe_{0.8}Cr_{0.2})_{81}B_{17}W_2$ as 18 and $(Fe_{0.8}Cr_{0.2})_{80}B_{20}$ as 19.

FIG. 21 illustrates crystallization enthalpies measured by differential scanning calorimetry for various alloys encompassed by the present invention. Specifically, FIG. 21 shows the alloy $Fe_{63}Cr_8Mo_2B_{17}C_5Si_1Al_4$ as 1, $(Fe_{0.85}Cr_{0.15})_{83}B_{17}$ as 2, $(Fe_{0.8}Cr_{0.2})_{83}B_{17}$ as 3, $(Fe_{0.75}Cr_{0.25})_{83}B_{17}$ as 4, $(Fe_{0.8}Mo_{0.2})_{83}B_{17}$ as 5, $(Fe_{0.6}Co_{0.2}Cr_{0.2})_{83}B_{17}$ as 6, $(Fe_{0.8}Cr_{0.15}Mo_{0.05})_{83}B_{17}$ as 7, $(Fe_{0.8}Cr_{0.2})_{79}B_{17}C_4$ as 8, $(Fe_{0.8}Cr_{0.2})_{79}B_{17}Si_4$ as 9, $(Fe_{0.8}Cr_{0.2})_{79}B_{17}Al_4$ as 10, $(Fe_{0.8}Cr_{0.2})_{75}B_{17}Al_4C_4$ as 11, $(Fe_{0.8}Cr_{0.2})_{75}B_{17}Si_4C_4$ as 12, $(Fe_{0.8}Cr_{0.2})_{75}B_{17}Si_4Al_4$ as 13, $(Fe_{0.8}Cr_{0.2})_{71}B_{17}Si_4C_4Al_4$ as 14, $(Fe_{0.7}Co_{0.1}Cr_{0.2})_{83}B_{17}$ as 15, $(Fe_{0.8}Cr_{0.2})_{76}B_{17}Al_7$ as 16, $(Fe_{0.8}Cr_{0.2})_{79}B_{17}W_2C_2$ as 17, $(Fe_{0.8}Cr_{0.2})_{81}B_{17}W_2$ as 18 and $(Fe_{0.8}Cr_{0.2})_{80}B_{20}$ as 19.

FIG. 22 shows the alloy $Fe_{63}Cr_8Mo_2B_{17}C_5Si_1Al_4$ as 1, $(Fe_{0.85}Cr_{0.15})_{83}B_{17}$ as 2, $(Fe_{0.8}Cr_{0.2})_{83}B_{17}$ as 3, $(Fe_{0.75}Cr_{0.25})_{83}B_{17}$ as 4, $(Fe_{0.8}Mo_{0.2})_{83}B_{17}$ as 5, $(Fe_{0.6}Co_{0.2}Cr_{0.2})_{83}B_{17}$ as 6, $(Fe_{0.8}Cr_{0.15}Mo_{0.05})_{83}B_{17}$ as 7, $(Fe_{0.8}Cr_{0.2})_{79}B_{17}C_4$ as 8, $(Fe_{0.8}Cr_{0.2})_{79}B_{17}Si_4$ as 9, $(Fe_{0.8}Cr_{0.2})_{79}B_{17}Al_4$ as 10, $(Fe_{0.8}Cr_{0.2})_{75}B_{17}Al_4C_4$ as 11, $(Fe_{0.8}Cr_{0.2})_{75}B_{17}Si_4C_4$ as 12, $(Fe_{0.8}Cr_{0.2})_{75}B_{17}Si_4Al_4$ as 13, $(Fe_{0.8}Cr_{0.2})_{71}B_{17}Si_4C_4Al_4$ as 14, $(Fe_{0.7}Co_{0.1}Cr_{0.2})_{83}B_{17}$ as 15, $(Fe_{0.8}Cr_{0.2})_{76}B_{17}Al_7$ as 16, $(Fe_{0.8}Cr_{0.2})_{79}B_{17}W_2C_2$ as 17, $(Fe_{0.8}Cr_{0.2})_{81}B_{17}W_2$ as 18 and $(Fe_{0.8}Cr_{0.2})_{80}B_{20}$ as 19.

FIG. 23 shows the alloy $Fe_{63}Cr_8Mo_2B_{17}C_5Si_1Al_4$ as 1, $(Fe_{0.85}Cr_{0.15})_{83}B_{17}$ as 2, $(Fe_{0.8}Cr_{0.2})_{83}B_{17}$ as 3, $(Fe_{0.75}Cr_{0.25})_{83}B_{17}$ as 4, $(Fe_{0.8}Mo_{0.2})_{83}B_{17}$ as 5, $(Fe_{0.6}Co_{0.2}Cr_{0.2})_{83}B_{17}$ as 6, $(Fe_{0.8}Cr_{0.15}Mo_{0.05})_{83}B_{17}$ as 7, $(Fe_{0.8}Cr_{0.2})_{79}B_{17}C_4$ as 8, $(Fe_{0.8}Cr_{0.2})_{79}B_{17}Si_4$ as 9, $(Fe_{0.8}Cr_{0.2})_{79}B_{17}Al_4$ as 10, $(Fe_{0.8}Cr_{0.2})_{75}B_{17}Al_4C_4$ as 11, $(Fe_{0.8}Cr_{0.2})_{75}B_{17}Si_4C_4$ as 12, $(Fe_{0.8}Cr_{0.2})_{75}B_{17}Si_4Al_4$ as 13, $(Fe_{0.8}Cr_{0.2})_{71}B_{17}Si_4C_4Al_4$ as 14, $(Fe_{0.7}Co_{0.1}Cr_{0.2})_{83}B_{17}$ as 15, $(Fe_{0.8}Cr_{0.2})_{76}B_{17}Al_7$ as 16, $(Fe_{0.8}Cr_{0.2})_{79}B_{17}W_2C_2$ as 17, $(Fe_{0.8}Cr_{0.2})_{81}B_{17}W_2$ as 18 and $(Fe_{0.8}Cr_{0.2})_{80}B_{20}$ as 19.

DETAILED DESCRIPTION OF THE PREFERRED EMBODIMENTS

Figure 1:
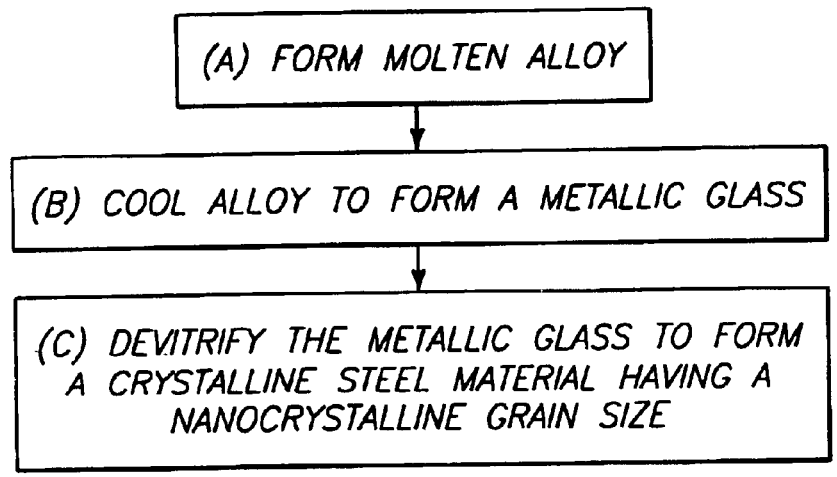
FIG. 1 is a block-diagram flowchart view of a method encompassed by the present invention.

This disclosure of the invention is submitted in furtherance of the constitutional purposes of the U.S. Patent Laws "to promote the progress of science and useful arts" (Article 1, Section 8).

The invention encompasses methodology for forming steel materials having nanocrystalline scale composite microstructures, methods of utilizing such steel materials, and also encompasses the steel material compositions. A process encompassed by the present invention is described generally with reference to the block diagram of FIG. 1. At an initial step (A) a molten alloy is formed. Such alloy comprises a steel composition. An exemplary alloy comprises at least 50% Fe and at least one element selected from the group consisting of Ti, Zr, Hf, V, Nb, Ta, Cr, Mo, W, Al, La, Ce, Pr, Nd, Sm, Eu, Gd, Th, Dy, Ho, Er, Tm, Yb, and Lu; and at least one element selected from the group consisting of B, C, N, O, P and S. In particular aspects of the present invention, the alloy will be a magnetic alloy with ultrafine crystal grains having a composition represented by the formula: Fe(100-x-y)M(x)B(y) (atomic percent) wherein M represents at least one element selected from Ti, Zr, Hf, V, Nb, Mo, Ta, Cr, W and Mn, wherein $15 \geq x \geq 24$, wherein $25 \geq y \geq 2$, and wherein $35 \geq (x+y) \geq 7$. Also, at least 50% of the alloy structure is preferably occupied by crystal grains having an average size of 1000 Å or less, with the crystal grains being based on a bcc structure. The alloy can further contain X (Si, Ge, P, Ga, etc.) and/or T (Au, Co, Ni, etc.).

Alloys of the present invention preferably comprise fewer than 11 elements, and can more preferably comprise fewer than seven elements. Additionally, the alloys can comprise fewer than five elements. An advantage in having fewer elements in the compositions is that it can be easier to reproduce a material if fewer components are utilized in forming the material. Generally, alloys of the present invention have from four to six elements in their compositions. Among such elements are iron; chromium, which can be included for corrosion resistance; boron and/or phosphors which can be included to generate a particular glass transition temperature; and one or both of molybdenum and tungsten which can be included for hardness.

Exemplary alloys which can be utilized in methodology of the present invention are: $(Fe_{0.85}Cr_{0.15})_{83}B17$, $(Fe_{0.8}Cr_{0.2})_{83}B_{17}$, $(Fe_{0.75}Cr_{0.25})_{83}B_{17}$, $(Fe_{0.8}Mo_{0.2})_{83}B_{17}$, $(Fe_{0.6}Co_{0.2}Cr_{0.2})_{83}B_{17}$, $(Fe_{0.8}Cr_{0.15}Mo_{0.05})_{83}B_{17}$, $(Fe_{0.8}Cr_{0.2})_{79}B_{17}C_4$, $(Fe_{0.8}Cr_{0.2})_{79}B_{17}Si_4$, $(Fe_{0.8}Cr_{0.2})_{79}B_{17}Al_4$, $(Fe_{0.8}Cr_{0.2})_{75}B_{17}Al_4C_4$, $(Fe_{0.8}Cr_{0.2})_{75}B_{17}Si_4C_4$, $(Fe_{0.8}Cr_{0.2})_{75}B_{17}Si_4Al_4$, $(Fe_{0.8}Cr_{0.2})_{71}B_{17}Si_4Al_4$, $(Fe_{0.7}Co_{0.1}Cr_{0.2})_{83}B_{17}$, $(Fe_{0.8}Cr_{0.2})_{76}B_{17}Al_7$, $(Fe_{0.8}Cr_{0.2})_{79}B_{17}W_2C_2$, $(Fe_{0.8}Cr_{0.2})_{81}B_{17}W_2$, and $(Fe_{0.8}Cr_{0.2})_{80}B_{20}$.

The alloy of step (A) can be formed by, for example, melting a composition under an argon atmosphere.

At step (B) of FIG. 1, the alloy is cooled to form a metallic glass. Such cooling typically comprises a rate of at least about $10^4$ K/s, with the rate varying depending on the particular composition of the molten alloy. The cooling can be accomplished by a number of different processes, including, for example, melt-spinning, gas atomization, centrifugal atomization, water atomization and splat quenching. The powder can be consolidated by, for example, hipping, hot pressing, hot extrusion, powder rolling, powder forging and dynamic compaction. In an exemplary method, the cooling of step (B) is accomplished by centrifugal atomization. Preferably, the melt stream leaves a centrifugal cup and is hit by high pressure helium gas to facilitate fast cooling (greater than $10^5$ K/s.) The helium gas can be collected, purified and reused. The speed of the rotating centrifugal cup is preferably about 40,000 RPM, and such speed can be adjusted to produce a fine powder with about a 25 micrometer mean size.

Referring to step (C) of FIG. 1, the metallic glass of step (B) is devitrified to form a crystalline steel material having a nanocrystalline grain size. Such devitrification can be accomplished by heating the metallic glass to a temperature of from about 600° C. to less than the melting temperature of the alloy. Such heating enables a solid state phase change wherein the amorphous phase of the metallic glass is converted to one or more crystalline solid phases. The solid state devitrification of the amorphous precursor from step (B) enables uniform nucleation to occur throughout the metallic glass to form nanocrystalline grains within the glass. The metal matrix microstructure formed via the devitrification can comprise a steel matrix (iron with dissolved interstitials), with an intimate mixture of ceramic precipitates (transition metal carbides, borides, silicides, etc.). The nanocrystalline scale metal matrix composite grain structure can enable a combination of mechanical properties which are improved compared to the properties which would exist with larger grain sizes or with the metallic glass. Such improved mechanical properties can include, for example, high strength, and high hardness coupled with significant ductility.

The particular temperature employed for devitrifying the metal glass can be varied depending on the particular alloy utilized in the glass, and a particular time of application.

Post treatment of the devitrified metallic material from step (C) can include a surface treatment utilized to transform only the surface of the material to a metallic glass. Exemplary surface treatment techniques are high and low pressure plasma spraying, high velocity oxyfuel spraying, and spray forming. The plasma spraying can be accomplished with a plasma spray system. The post treatment can offer improvements in, for example, corrosion resistance and lowering the coefficient of friction of a steel material. Accordingly, it can be advantageous to treat at least the surface of a crystalline steel material to convert such surface to a metallic glass. It is noted that a metallic glass coating can also offer advantages over existing coatings such as, for example, chrome, nickel and tin plating in that the metallic glass coating can be cheaper and can give a better metallurgical bond between the surface and the base metal.

Figure 2:
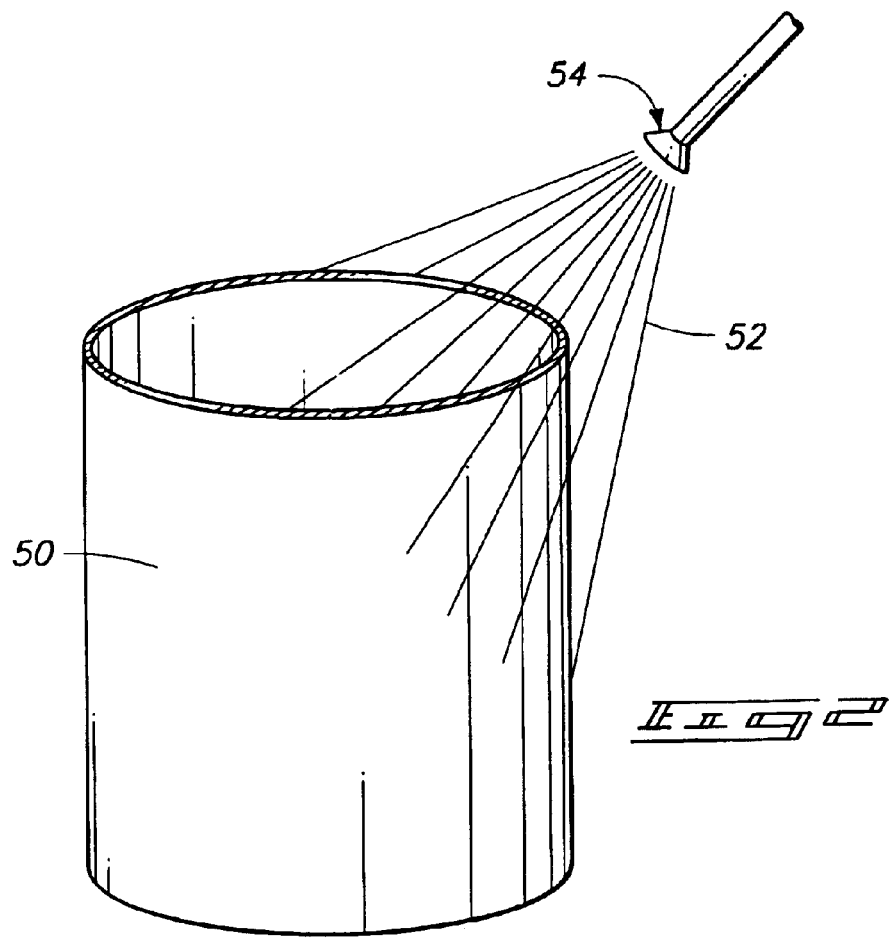
FIG. 2 is a diagrammatic perspective view of a barrel being treated according to a method of the present invention.

Referring to FIG. 2, a specific embodiment application of the present invention is illustrated. Specifically, FIG. 2 illustrates a metallic barrel 50 being sprayed with a molten metal material 52. Molten metal material 52 is sprayed from a spraying device 54, and can comprise, for example, one or more of the above-described exemplary alloys of the present invention. The molten metal can be formed by melting an alloy composition under an argon atmosphere and subsequently centrifugally atomizing the alloy composition. As the melt stream leaves a centrifugal cup, it can be hit by a high pressure helium gas to form a fine powder of solidified metallic alloy material with such fine powder having about a 25 micrometer mean size. The fine powder can be fed into a plasma (high or low pressure) system wherein it is converted to a liquid spray which is sprayed on the inside and outside of metallic drum 50. In particular applications, drum 50 comprises a steel drum, such as, for example, a 55 gallon steel drum. It is noted that the powder may or may not be fully melted upon exposure to the plasma, and will be deposited into and onto the surface of barrel 50 as a continuous coating. In either event, the metallic material 52 sprayed onto and within drum 50 cools rapidly to form a metallic s glass. Drum 50 can be subsequently heat-treated at a temperature of equal to or greater than 600° C. to devitrify the metallic glass.

The metallic structure formed over and within barrel 50 from material 52 can have greater corrosion resistance than stainless steel. Drum 50 be utilized, for example, for storing corrosive and otherwise dangerous materials, such as, for example, spent nuclear fuel. If a surface of material 52 is coated with a metallic glass, the anti-corrosive properties and low coefficient of friction properties associated with metallic glass can be obtained.

Figure 3:
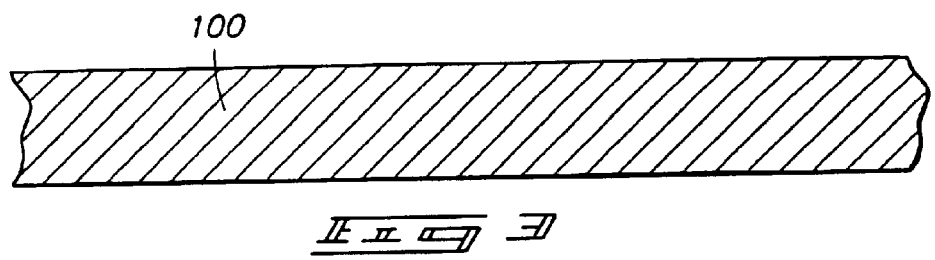
FIG. 3 is a fragmentary, diagrammatic, cross-sectional view of a metallic material substrate at a preliminary step of a treatment process encompassed by the present invention.

FIGS. 3–6 illustrate another embodiment application of the present invention. Referring to FIG. 3, a metallic substrate 100 is provided. Such substrate can comprise, for example, one or more of the above-described exemplary alloys of the present invention.

Figure 4:
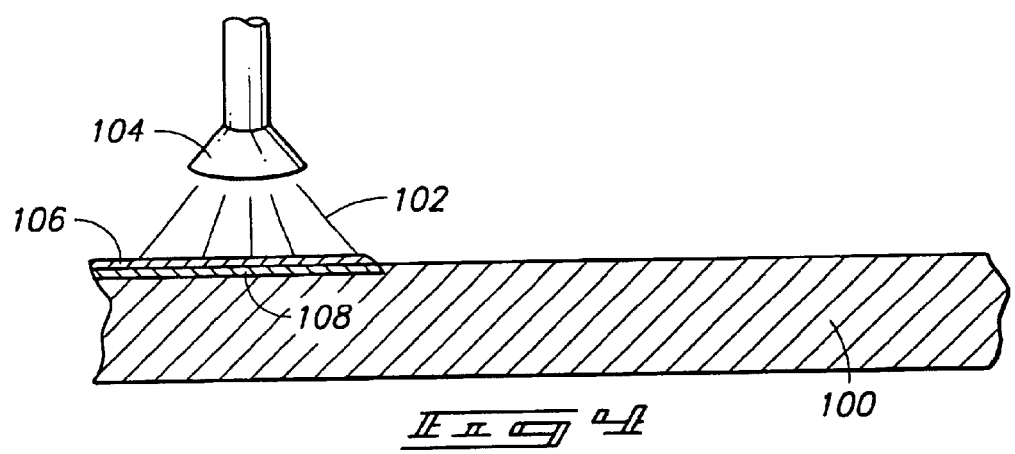
FIG. 4 is a view of the FIG. 3 fragment shown at a processing step subsequent to that of FIG. 3.

Referring to FIG. 4, a metallic melt 102 is sprayed onto substrate 100 utilizing a sprayer 104. Melt 102 can comprise, for example, a molten alloy comprising one or more of $(Fe_{0.85}Cr_{0.15})_{83}B17$, $(Fe_{0.8}Cr_{0.2})_{83}B_{17}$, $(Fe_{0.75}Cr_{0.25})_{83}B_{17}$, $(Fe_{0.8}Mo_{0.2})_{83}B_{17}$, $(Fe_{0.6}Co_{0.2}Cr_{0.2})_{83}B_{17}$, $(Fe_{0.8}Cr_{0.15}Mo_{0.05})_{83}B_{17}$, $(Fe_{0.8}Cr_{0.2})_{79}B_{17}C_4$, $(Fe_{0.8}Cr_{0.2})_{79}B_{17}Si_4$, $(Fe_{0.8}Cr_{0.2})_{79}B_{17}Al_4$, $(Fe_{0.8}Cr_{0.2})_{75}B_{17}Al_4C_4$, $(Fe_{0.8}Cr_{0.2})_{75}B_{17}Si_4C_4$, $(Fe_{0.8}Cr_{0.2})_{75}B_{17}Si_4Al_4$, $(Fe_{0.8}Cr_{0.2})_{71}B_{17}Si_4Al_4$, $(Fe_{0.7}Co_{0.1}Cr_{0.2})_{83}B_{17}$, $(Fe_{0.8}Cr_{0.2})_{76}B_{17}Al_7$, $(Fe_{0.8}Cr_{0.2})_{79}B_{17}W_2C_2$, $(Fe_{0.8}Cr_{0.2})_{81}B_{17}W_2$, and $(Fe_{0.8}Cr_{0.2})_{80}B_{20}$. Instead of being in a molten form, material 102 can alternatively comprise a powder material heated to a sufficient temperature to bond with the metal of layer 100.

Material 102 deposits on substrate 100 to form a layer 106. Material 102 also heats an exposed surface of material 100 to form a heat-treated portion 108 of material 100. If material 100 comprises a metallic glass, heat-treated portion 108 can comprise a devitrified material. Specifically, if layer 106 is formed at a temperature which heats a surface of layer 100 to greater than 600° C., such heating can devitrify a portion of material 100 exposed to such temperatures. In particular applications, temperatures greater than 600° C. can permeate entirely through substrate 100 to heat-treat an entire thickness of material 100. Spray nozzle 104 is preferably resistant to the temperature and composition of material 102.

Figure 5:
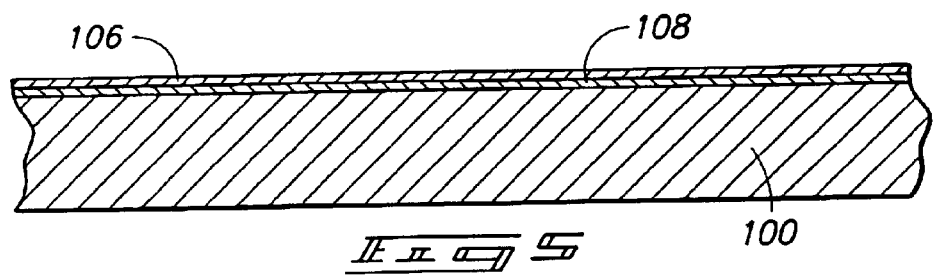
FIG. 5 is a view of the FIG. 3 fragment shown at a processing step subsequent to that of FIG. 4.

Referring to FIG. 5, substrate 100 is illustrated after layer 106 has been formed across an entire surface of substrate 100. Heat-treated portion 108 also extends across an entire surface of substrate 100. In particular embodiments, layer 106 can be formed as a metallic glass.

Figure 6:
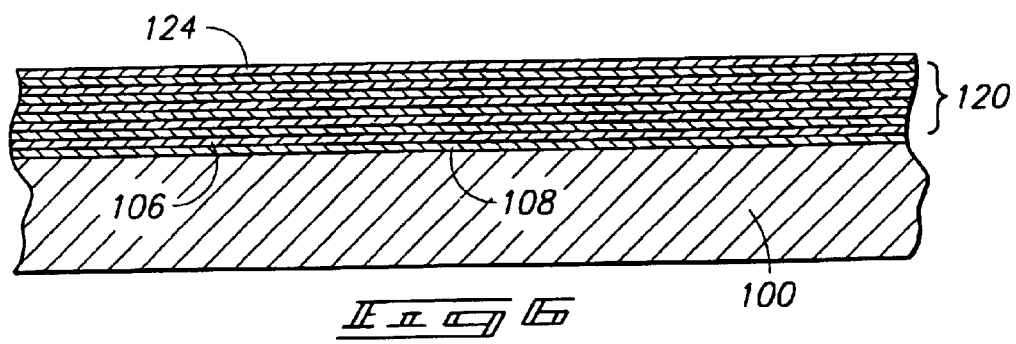
FIG. 6 is a view of the FIG. 3 fragment shown at a processing step subsequent to that of FIG. 5.

Referring to FIG. 6, subsequent treatments of the type illustrated in FIG. 4 can be utilized to form multiple heat-treated layers 120 and an exposed outer surface layer 124. Note that one of the lower heat-treated layers 120 is previous layer 106. The subsequent formation of another metallic glass layer over layer 106 has heat-treated the entire layer 106. In particular embodiments wherein layer 106 comprises a metallic glass, such heat treatment can devitrify layer 106. Accordingly, heat treated layers 120 can comprise devitrified metal layers. In alternative methods of the present invention, each of the layers 106 and 120 can be deposited as metallic glass and can remain in the metallic glass form during deposition of remaining layers 120. Then, if desired, some or all of the deposited layers can be heat-treated to at least partially devitrify the coating defined by layers 106 and 120.

Outermost layer 124 may or may not be heat-treated, and can comprise a metallic glass. Accordingly, the method of the present invention has enabled an exterior coating to be formed over layer 100, with said exterior coating comprising devitrified metal layers 120 and an outermost surface of metallic glass 124.

The methodology described with reference to FIGS. 3–6 can have application for a number of uses, including military uses. Specifically, armor can be formed out of a material 100. If the armor becomes punctured or cracked, the methodology of FIGS. 3–6 can be utilized to repair the armor and effectively build a metallic shell over the weakened areas of the armor. Spraying device 104 can be adapted to be utilizable in battlefield situations.

In addition to the utilizations described above for materials of the present invention, the materials can also be utilized as powders for surface finishing (i.e., mechanical blasting) and surface treatments such as, for example, shot peening.

The invention can be considered a method for forming a new class of steel called devitrified nanocomposite (DNC) steel, with DNC steel being defined as having a primarily nanoscale (less than 100 nanometer) microstructure grain size developed by processing the steel through a solid-solid transformation (specifically, glass devitrification). Alloys are developed having low cooling rates (less than $10^6$ K/s) for metallic glass formation, and accordingly the alloy compositions form metallic glasses when rapidly solidified by a chill surface (such as, for example, melt-spinning, splat quenching, etc.) or atomization (gas, water, centrifugal, etc.) methods. The glass is utilized as a precursor stage, and the alloy subsequently processed through a glass devitrification transformation upon heating above a crystallization temperature of the alloy. Due to uniform nucleation in the glass coupled with a high nucleation frequency, there is little time for grain growth processes, and nanoscale nanocomposite microstructures (i.e., grains) result. The nanocomposite microstructures can lead to materials having significant increases in hardness and strength over conventional steel alloys.

Initial studies described herein show that DNC steel formed in accordance with methodology of the present invention has exceptional hardness and wear resistance, and can be used potentially for any application which involves sliding, rolling, or rotation. Additionally, initial studies have shown that the unlubricated DNC steel surface has exceptionally low coefficients of friction (in the range of lubricated steels) which can be a beneficial property in reducing wear resistance, frictional energy losses, and heating between moving surfaces. This can allow the use of DNC steel in unlubricated applications, and can also be useful as a fail-safe mechanism allowing additional time before failure in some applications, such as gasoline or diesel engines, where lubrication is unexpectedly lost. The high wear resistance of DNC steel, coupled with low friction, can allow extension of the lifetime of parts formed from DNC steel relative to parts formed from conventional steel alloys. Such can enable large savings in both operating energy and cost associated with part replacement, repair, maintenance and down-time. Exemplary applications for utilization of DNC steels of the present invention include bearings, gun barrel surfaces, bearing journals, hydraulic cylinder connecting rods, crankshafts, pistons, cylinder liners, gears, camshafts, universal joints, valves, gun breach boxes, missile launcher tubes, and tank gear boxes.

Unlike conventional steel alloys which rely on manipulation of solid state eutectoid transformation ($\gamma_{sol}=\alpha_{sol}+Fe_3C$), DNC steel utilizes a different approach, and specifically utilizes processing through a solid/solid state glass devitrification transformation. DNC steel alloys have been developed which have exceptionally low cooling rates ($10^3$ K/s to $10^5$ K/s) for metallic glass formation. This can allow the production of metallic glass structures during rapid solidification via chill surface or atomization methods.

Figure 7:
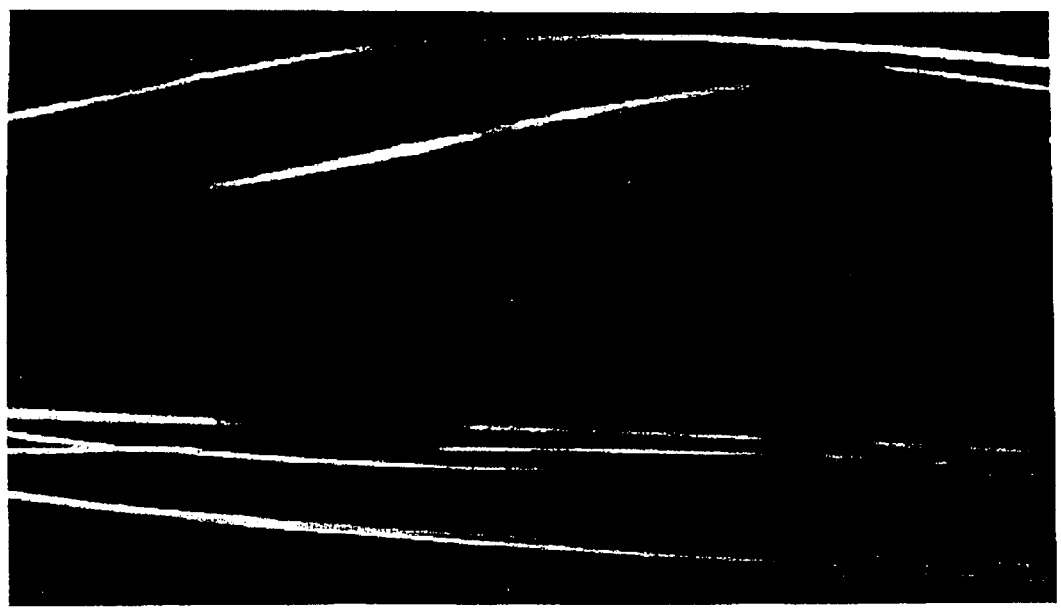
FIG. 7 is an optical micrograph of a metallic glass ribbon formed in accordance with methodology of the present invention, and formed from a composition comprising $Fe_{63}Cr_8Mo_2B_{17}C_5Si_1Al_4$.
Figure 8:
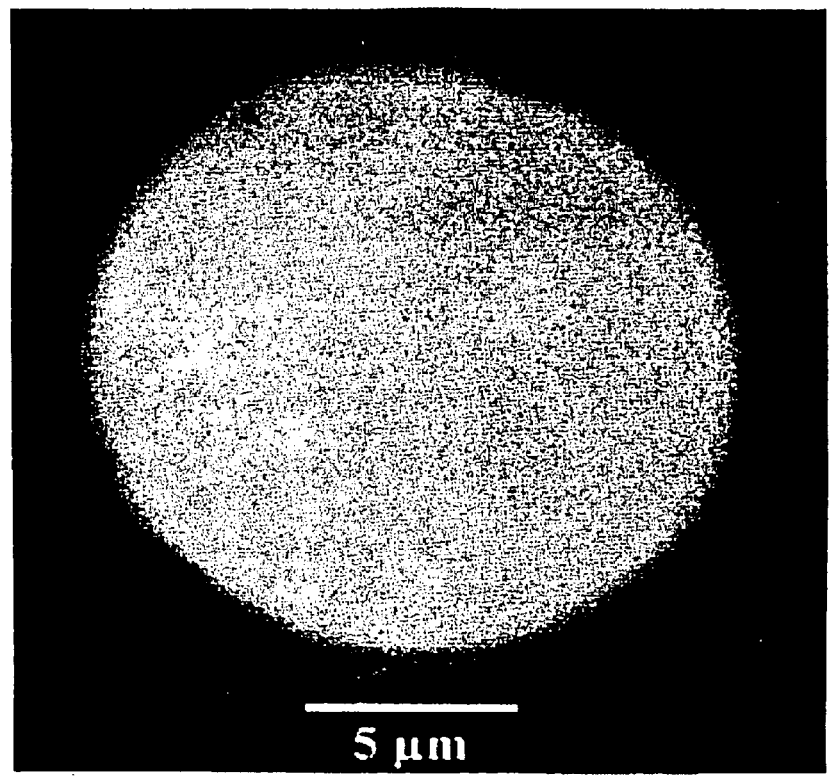
FIG. 8 is a scanning electron microscope micrograph of a cross section of a gas atomized powder particle formed in accordance with the present invention, and formed from a composition comprising $Fe_{63}Cr_8Mo_2B_{17}C_5Si_1Al_4$.

Examples of DNC steel melt-spun ribbon and gas atomized powder are shown in FIGS. 7 and 8, respectively. Metallic glass structures are produced by both of these rapid solidification processing methods. The glass precursor can be devitrified into a nanoscale composite microstructure by heating above the crystallization temperature.

Figure 9:
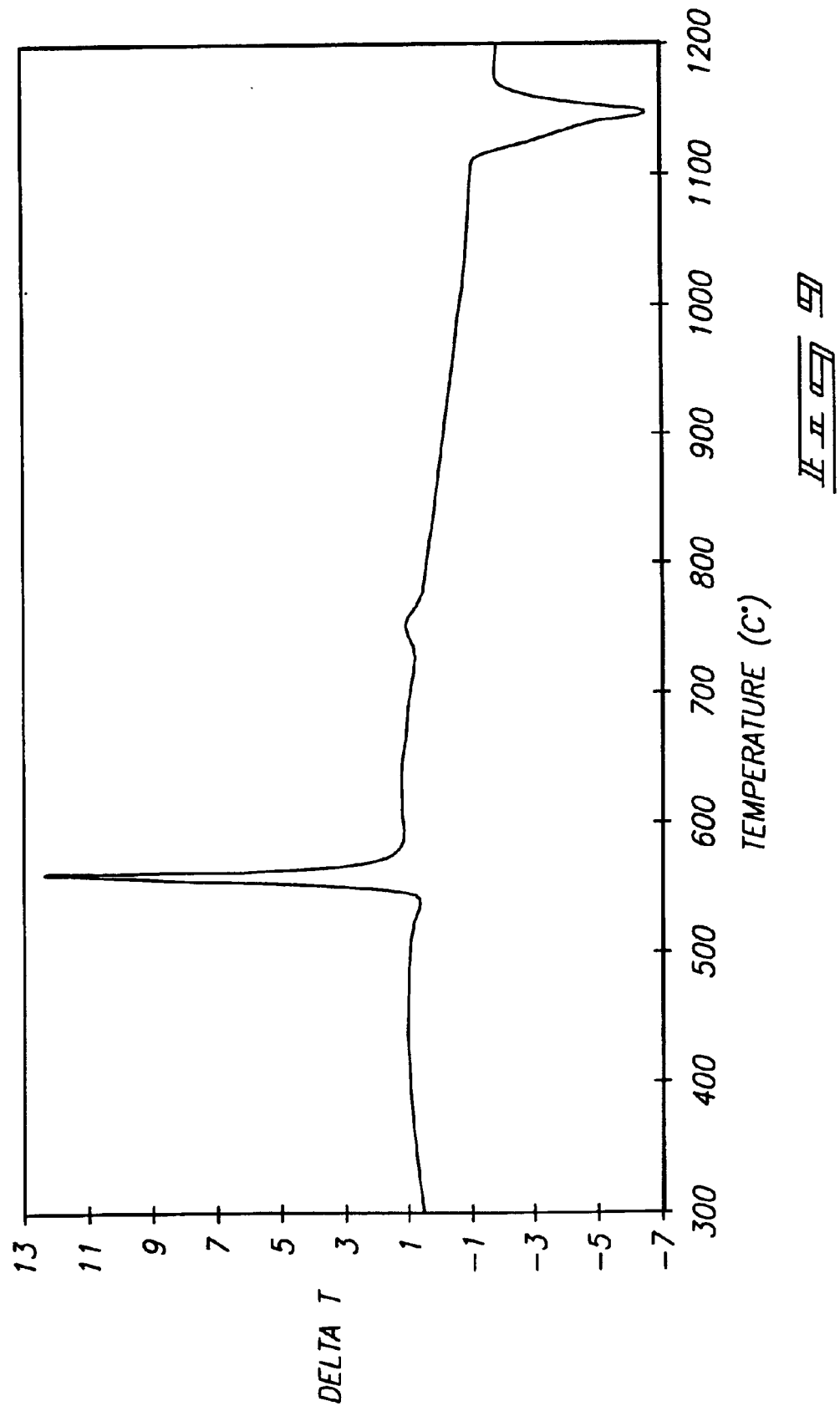
FIG. 9 is a graph illustrating the results of a differential thermal analysis scan of a ribbon produced in accordance with the present invention. The ribbon was produced from a composition comprising $Fe_{63}Cr_8Mo_2B_{17}C_5Si_1Al_4$. An exothermic glass to crystallization transition occurs at 550° C., and an endothermic solid to liquid melting transition occurs at 1,150° C.
Figure 10:
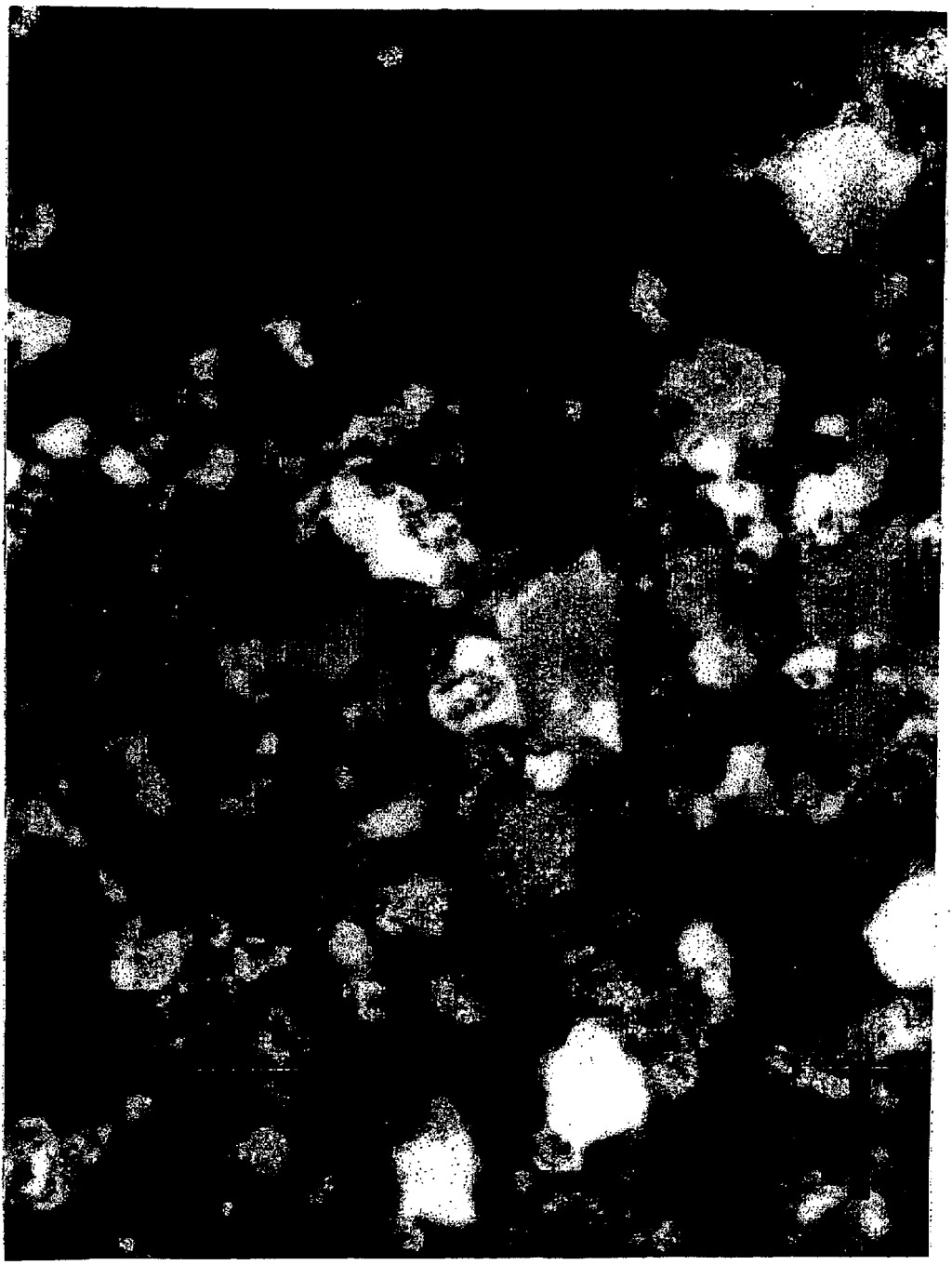
FIG. 10 is a TEM micrograph of a steel alloy produced in accordance with the methodology of the present invention, and comprising a composition $Fe_{63}Cr_8Mo_2B_{17}C_5Si_1Al_4$, which has been heat treated for 650° C. for one hour. A nanoscale nanocomposite microstructure is visible, with phase sizes from 1 to 75 nanometers.

A differential thermal analysis scan for as-spun DNC steel is shown in FIG. 9. The glass crystallization temperature typically varies from 750K to 900K with enthalpies of transformation from −75 J/g to −200 J/g, and melting temperatures from 1,375K to 1,500K for alloys encompassed by the present invention (as described in the charts of FIGS. 20–23). Because there is uniform nucleation and extremely high nucleation frequency during crystallization of alloys of the present invention, there can be little time for grain growth before impingement between neighboring grains and accordingly nanoscale nanocomposite microstructures are formed. The individual phase sizes can vary from 1 to 75 nanometers, which is finer than conventional steels produced by conventional casting or even when rapidly solidified. When the microstructure is reduced to the nanoscale level, a high percentage of the atoms of the material (about 30%) can be associated with grain boundaries, and an extremely high density of two-dimensional defect interfaces (such as phase in grain boundaries) reside in the microstructure. The microstructure of a devitrified ribbon showing the nanoscale nanocomposite microstructure is shown in FIG. 10. The nanostructure results in the development of extreme strength and hardness, which are significantly higher than found in conventional steel or other metallic based alloys.

The hardness of glass and devitrified DNC steel has been measured using both nanoindentor and Vickers microhardness testing, and excellent agreement is found between the two methods. Specialized nanoindentor testing using a Berkovich indentor was performed on the as-atomized and heat-treated sieved (10–20 micrometer and 75–100 micrometer) gas atomized particles from a $Fe_{63}Cr_8Mo_2B_{17}C_5Si_1Al_4$ alloy as a function of depth into the particle. The elastic modulus was found to be as high as 300 GPa, which is approximately 50% higher than a conventional steel (which commonly exhibits elastic moduli from 200 GPa to 220 GPa). This means that bonding strength is increased, which can be of beneficial result since it allows close tolerances to be maintained during application of high elastic loads, and can have additional benefits concerning wear resistance. The hardness was also found to be extremely high at greater than 15 GPa, which is harder than conventional metallic materials. Examples of various compositions which can be utilized in methodology of the present invention for forming hard materials are shown in Table 1. In referring to Table, the various compositions are given reference names (specifically, they are referred to as alloys DARX) to simplify reference to the compositions herein. Table 2 contrasts hardness of various materials with the alloy DAR1.

TABLE 1

DNC Alloy Compositions

| Alloy | Composition |
|---|---|
| DAR1 | $Fe_{63}Cr_8Mo_2B_{17}C_5Si_1Al_4$ |
| DAR2 | $(Fe_{0.85}Cr_{0.15})_{83}B_{17}$ |
| DAR3 | $(Fe_{0.8}Cr_{0.2})_{83}B_{17}$ |
| DAR4 | $(Fe_{0.75}Cr_{0.25})_{83}B_{17}$ |
| DAR5 | $(Fe_{0.8}Mo_{0.2})_{83}B_{17}$ |
| DAR6 | $(Fe_{0.6}Co_{0.2}Cr_{0.2})_{83}B_{17}$ |
| DAR7 | $(Fe_{0.8}Cr_{0.15}Mo_{0.05})_{83}B_{17}$ |
| DAR8 | $(Fe_{0.8}Cr_{0.2})_{79}B_{17}C_4$ |
| DAR9 | $(Fe_{0.8}Cr_{0.2})_{79}B_{17}Si_4$ |
| DAR10 | $(Fe_{0.8}Cr_{0.2})_{79}B_{17}Al_4$ |
| DAR11 | $(Fe_{0.8}Cr_{0.2})_{75}B_{17}Al_4C_4$ |
| DAR12 | $(Fe_{0.8}Cr_{0.2})_{75}B_{17}Si_4C_4$ |
| DAR13 | $(Fe_{0.8}Cr_{0.2})_{75}B_{17}Si_4Al_4$ |
| DAR14 | $(Fe_{0.8}Cr_{0.2})_{71}B_{17}Si_4C_4Al_4$ |
| DAR15 | $(Fe_{0.7}Co_{0.1}Cr_{0.2})_{83}B_{17}$ |
| DAR16 | $(Fe_{0.8}Cr_{0.2})_{76}B_{17}Al_7$ |
| DAR17 | $(Fe_{0.8}Cr_{0.2})_{79}B_{17}W_2C_2$ |
| DAR18 | $(Fe_{0.8}Cr_{0.2})_{81}B_{17}W_2$ |
| DAR19 | $(Fe_{0.8}Cr_{0.2})_{80}B_{20}$ |
| DAR20 | $Fe_{64}Ti_3Cr_5Mo_2B_{16}C_5Si_1Al_2La_2$ |

TABLE 2

Example Hardness of Metallic Materials

| Material | Hardness |
|---|---|
| 18 Cr-10 Ni austenitic stainless steel | 1.5 GPa |
| 0.74 plain carbon steel | 4.9 GPa |
| 4340 ultra high strength steel | 5.5 GPa |
| T5 W tool steel | 7.5 GPa |
| 90 WC - 10 Co cemented carbide | 10.1 GPa |
| $Fe_{63}Cr_8Mo_2B_{17}C_5Si_1Al_4$(DAR1) | 15.5 GPa |

From the hardness determined for DAR1, the yield strengths for the DNC steel can be estimated to be 725 ksi, which is significantly higher than conventional (150 ksi) or ultra high strength (220 ksi) steels. If the plasticity is fully developed, the yield strength can be estimated to be ⅓ of the hardness. This gives the DNC steel a specific strength of $0.65 \times 10^6 M$ which makes this material an alternate for Al in lightweight applications. Little hardness difference was found between the large and small heated powders indicating that similar microstructures were obtained independent of powder size. It is noted that the hardness tests described herein were relative to a material DAR1 ($Fe_{63}Cr_8Mo_2B_{17}C_5Si_1Al_4$) which is not a preferred material of the present invention. Rather, preferred materials of the present invention would have fewer elements, and are listed as DAR2 through DAR 19 in Table 1.

Figure 11:
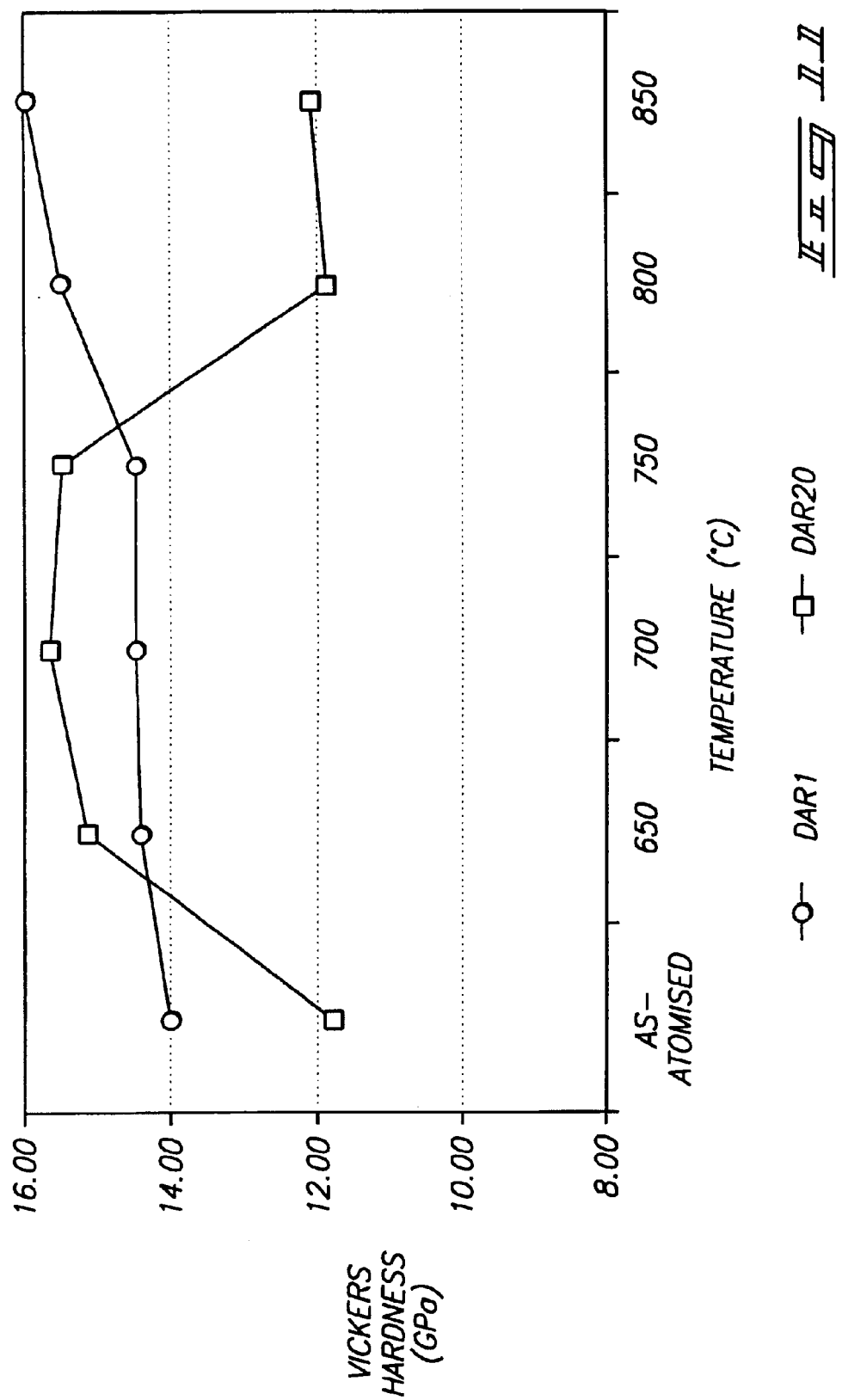
FIG. 11 illustrates Vickers hardness for different metallic alloys. Specifically, the figure compares DAR1 ($Fe_{63}Cr_8Mo_2B_{17}C_5Si_1Al_4$) with DAR20 ($Fe_{64}Ti_3Cr_5Mo_2B_{16}C_5Si_1Al_2La_2$). The hardness is compared as a function of heat treatment temperature.
Figure 11:
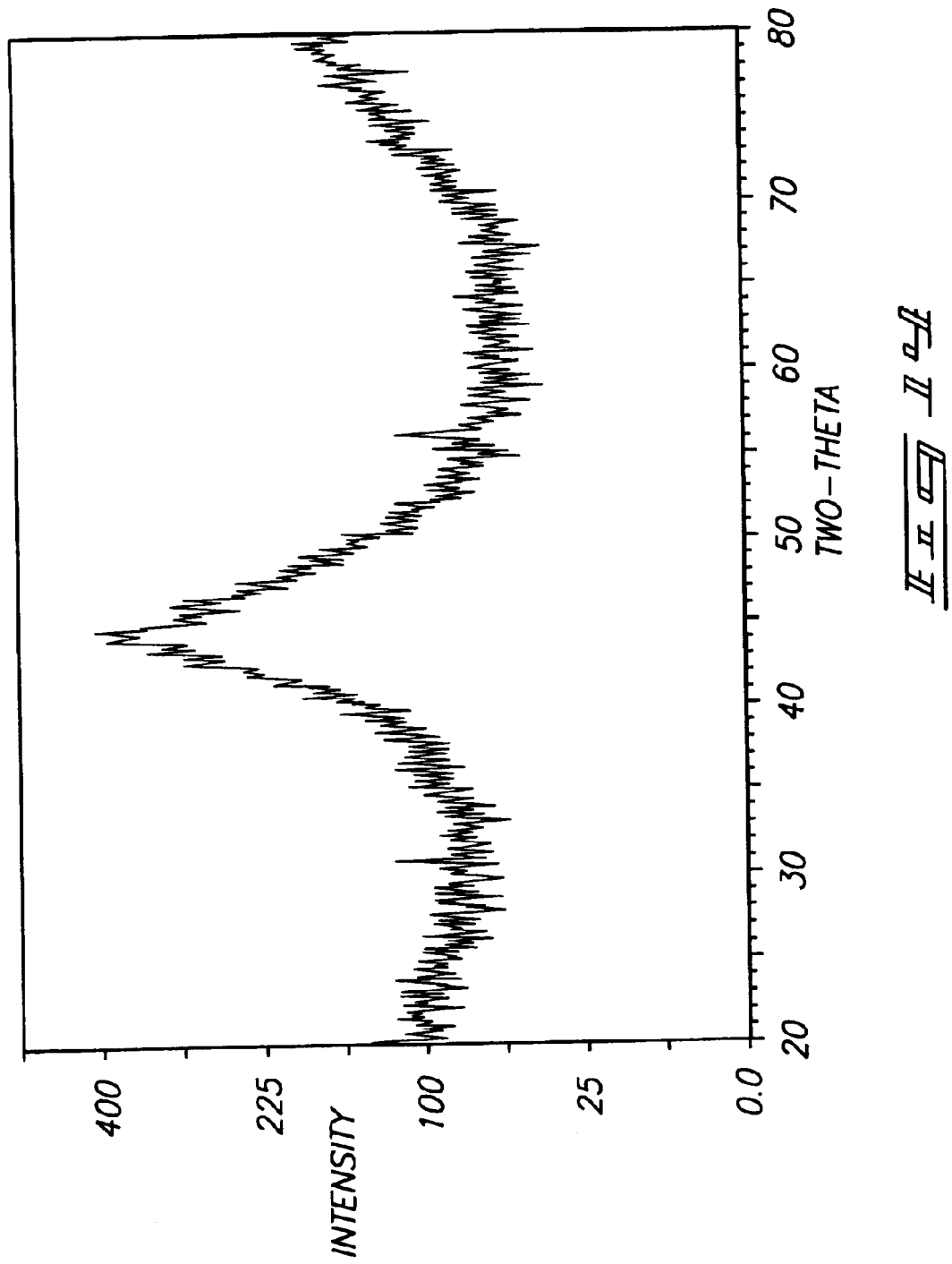

A preferred material of the present invention (specifically DAR20) is compared with DAR1 in FIG. 11. Specifically, Vickers microhardness measurements with a 100 gram load were performed on 75 micrometer to 100 micrometer powder size fractions for as-atomized alloys, and also as a function of heat treatment temperature. The tested alloys exhibited extreme hardness from 10.1 GPa to 16.0 GPa Vickers hardness. Examples of diamond pyramid indentations on a melt-spun ribbon and gas-atomized powder particle are shown in FIG. 12. While the Rockwell C is the most common hardness measurement for steels, it cannot be used in the present case due to the extreme hardness of the alloys of the present invention (which are off of the Rockwell C scale). Note that a Vickers Hardness number of 9.2 GPa corresponds to a Rockwell C of 68. Referring again to FIG. 11, it is noted that little hardness change occurs in the as-atomized state of alloys of the present invention after subsequent heat treating. This can be significant, as it means that optimum microstructures are obtained directly during solidification and the optimum structures are stable to high temperatures (at least to 850° C., as shown in FIG. 11).

DNC steels contain multiple combinations of elements which result in relatively low melting points (typically around 1,150° C.) and low melt viscosities. This can make the DNC steels easy to process from the liquid state, and ideal feedstock materials for forming coatings by thermal deposition methods. Initial low plasma spraying tests have been performed utilizing the atomized 20 to 50 micrometer $Fe_{63}Cr_8Mo_2B_{17}C_5Si_1Al_4$ steel powder as feed stock. Several uniform DNC steel coatings of 0.1 inch in thickness were deposited onto 4"×4"301 stainless steel plates (shown in FIG. 13). While typical thermally deposited coatings are only 25 micrometers to 100 micrometers thick, much thicker coatings (up to 2,500 micrometers) were sprayed to illustrate an extreme case (in other words, thinner coatings are easier to spray, but thicker coatings were sprayed to illustrate operability of a method of the present invention).

Figure 15:
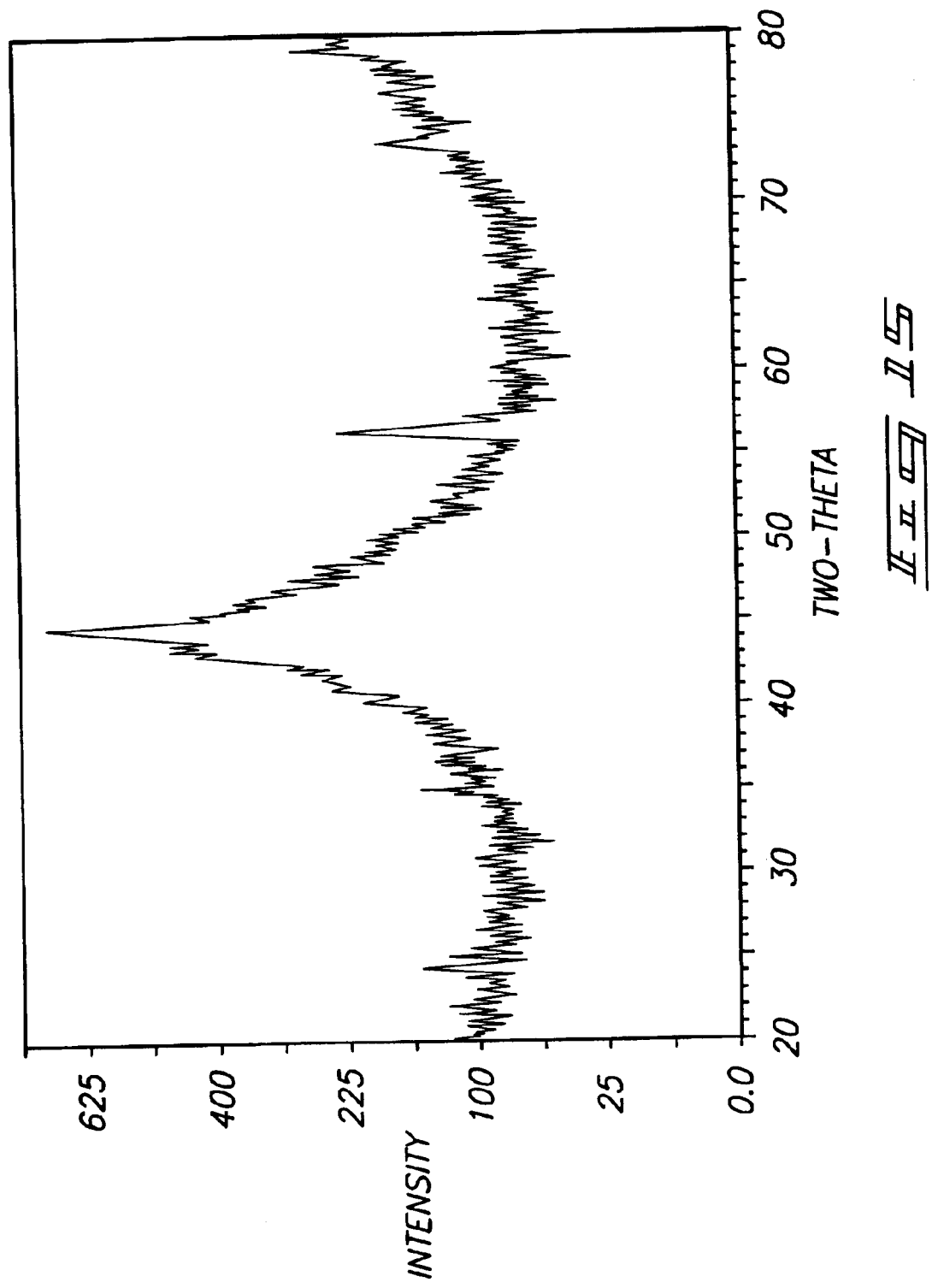
FIG. 15 shows an x-ray diffraction scan of the plasma-sprayed composition of FIG. 14, and illustrates the structure at the substrate surface.

Metallographic examinations of the coatings indicate that the percent porosity of the initial coatings was at least 3%. X-ray diffraction scans were performed both on the substrate side and free surface side of the coatings, and show that an amorphous structure was obtained through the cross-sectioning of the coatings (specifically, FIG. 14 shows an x-ray structure of a free surface side of the coating, and FIG. 15 shows an x-ray structure of the substrate side of the coating). Differential scanning calorimetry methods verified the formation of the glass structure in the coating which exhibited a high crystallization enthalpy (−110 J/g). This result is surprising due to the supreme thickness of the coating which resulted from successive build-up of continuous layers of deposited powder, and the fact that the substrate was not cooled. Thus, DNC steel coatings represent a class of materials called bulk glasses. Bulk glasses are normally very difficult to produce, but readily form in the DNC alloys by thermal processing methods.

The as-sprayed DNC metallic glass coatings can be devitrified into a nanoscale structure by heating above the crystallization temperature. However, due to the unique properties of the metallic glasses, the glass state itself may be useful as a coating. Metallic glasses are essentially super-cooled liquids, and have structures which are very homogeneous. Typically there are few defects, and there can be a complete absence of grains and phase boundaries. Hardness testing was performed on both the as-sprayed (amorphous) and heat-treated (800° C. for one hour) nanocrystalline coatings. The Vickers hardness of these coatings was found to be 10.9 GPa and 13.8 GPa for the as-sprayed and heat-treated coatings, respectively. It is noted that while the amorphous sample is not as hard as the crystalline sample, it is still harder than the hardest tool steel (about 9.3 GPa), or tungsten carbon (WC) cemented carbide cutting tool (about 10.0 GPa).

Figure 16:
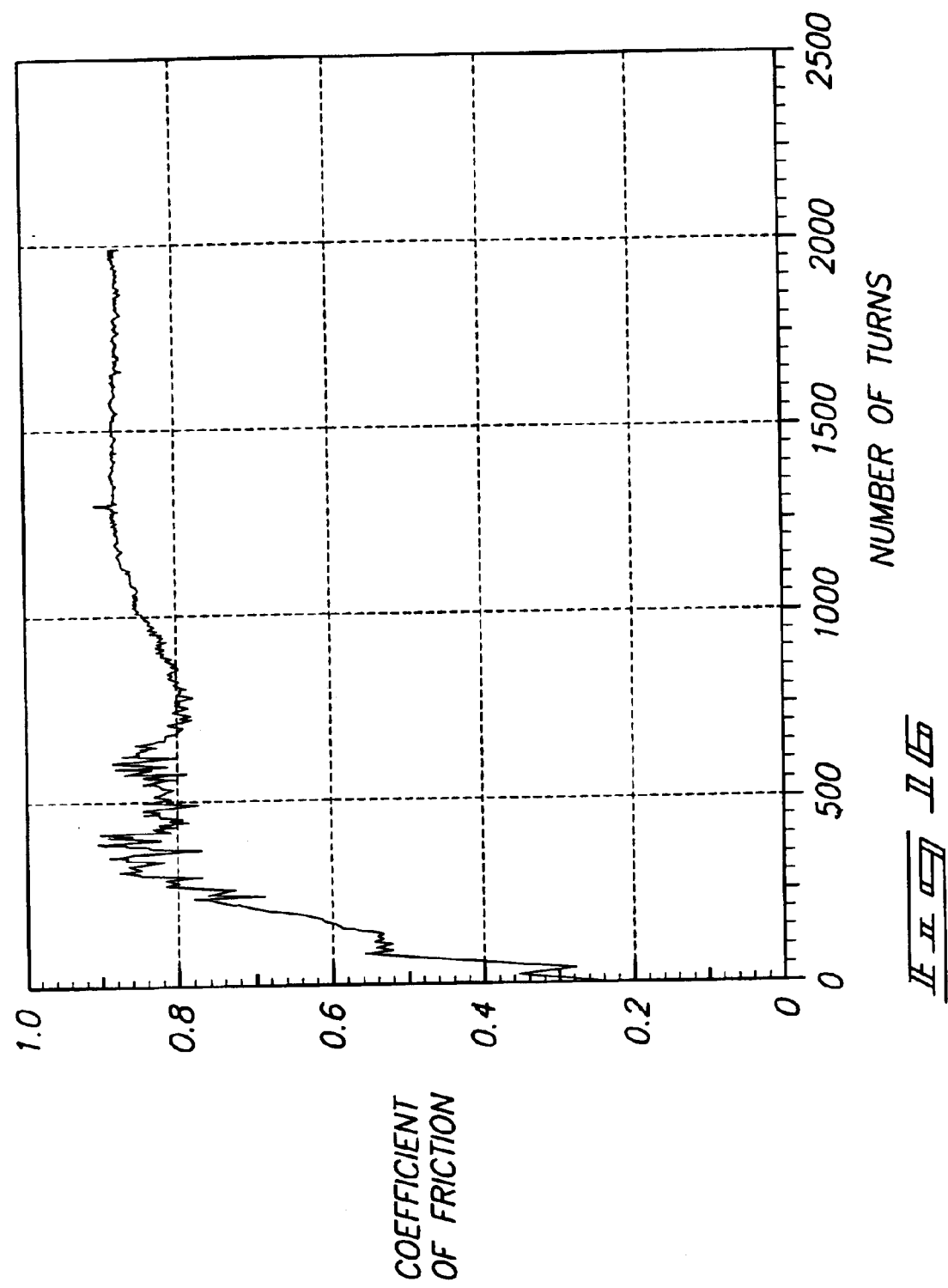
FIG. 16 illustrates a graph showing coefficient of friction versus the number of turns for Pin On Disk testing of a spray coating. The tested coating was $Fe_{63}Cr_8Mo_2B_{17}C_5Si_1Al_4$. It is noted that while the initial friction was low, $Si_3N_4$ deposition and buildup caused the friction to increase. (The sliding friction of $Si_3N_4$ on itself is 0.8).

Tribology testing experiments were done on the as-sprayed and heat-treated (100° C. for one hour) plasma sprayed coatings using ASTM G99 Pin-on-Disk tests. The "pin" was a one-half inch diameter $Si_3N_4$ ball which was rotated at a test speed of 97 RPM, with a test radius of 10.4 mm and with no lubrication. During the test, the coefficients of friction were measured (shown in FIG. 16). The coefficient of static friction for the steel substrate in both the as-sprayed and heat-treated condition was 0.22, which represents a low value. For example, the following coefficients of sliding friction were obtained for specimens sliding over a normalized steel (0.13% C, 3.42% Ni): aluminum (0.6), cartridge brass (0.5), copper (0.8), cast iron (0.4), and normalized steel (on itself 0.8). For conventional steels, the coefficients of static friction for unlubricated surfaces generally vary from 0.8 to 1.0, while lubricated steels have much lower values (typically from 0.1 to 0.25). Thus, the unlubricated DNC steels have coefficients of static friction in the range of lubricated steel surfaces. Accordingly, utilization of DNC steel coatings in place of conventional steel may allow the elimination of lubrication in some applications. Note that the coefficient of sliding friction of the steel substrate could not be measured due to $Si_3N_4$ deposition from the pin.

Figure 17:
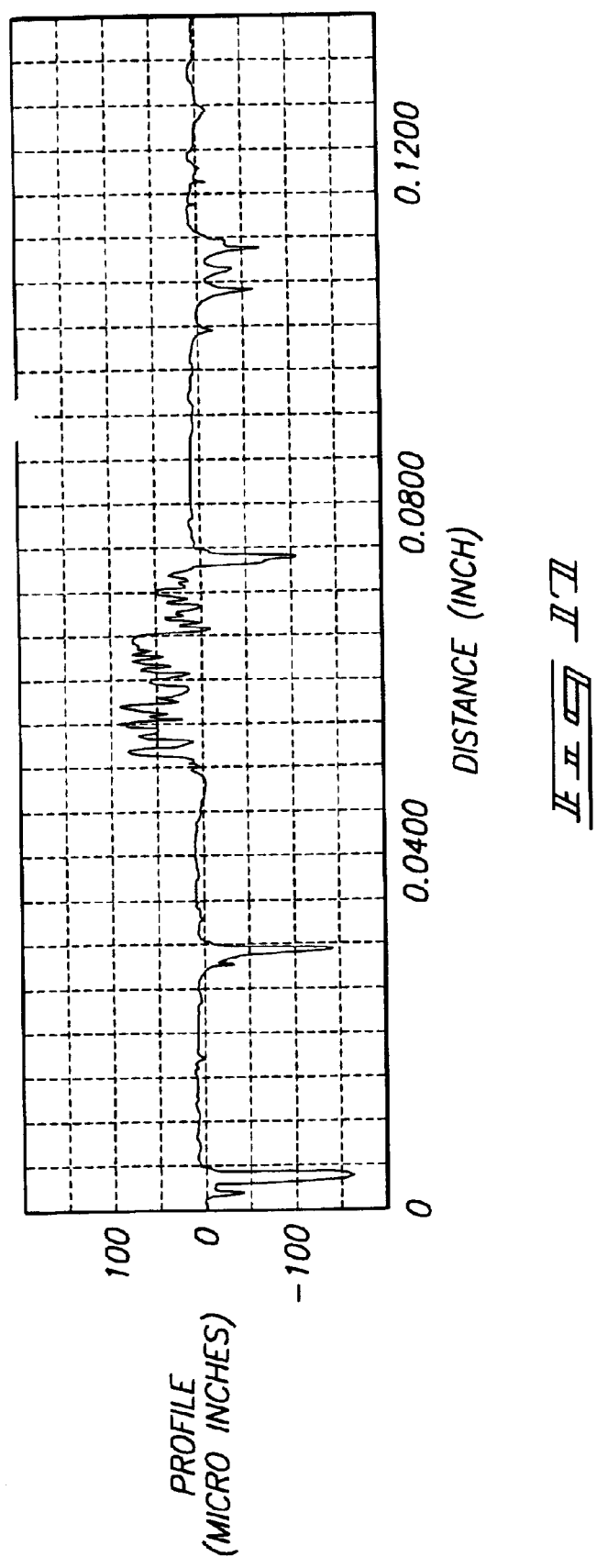
FIG. 17 is a profile curve of a "wear-groove" on an as-sprayed steel substrate after 2,000 cycles of Pin On Disk testing. As shown, instead of a groove developing on the steel substrate, the $Si_3N_4$ wore and deposited material onto the substrate. The tested composition was $Fe_{63}Cr_8Mo_2B_{17}C_5Si_1Al_4$.

The profile of the wear surface of the steel showed that the steel experienced no wear during the test (FIG. 17). Instead of the expected wear groove, a raised hill of deposited $Si_3N_4$ was found on the steel surface. Examination of the silicon nitride ball showed that it experienced a large ball scar as a result of wear. This was surprising due to the hardness of the ball material (15.4 GPa), which is used specifically for these type of tests due to its excessive hardness and wear resistance. Note that $Si_3N_4$ is currently the hardest pin material available to perform this ASTM test.

The $Fe_{63}Cr_8Mo_2B_{17}C_5Si_1Al_4$ steel utilized in generating the data described above is an exemplary DNC steel. However, it suffers from a disadvantage of having numerous elements included therein, which can make it difficult to produce uniform batches of the material. Accordingly, improved DNC alloys have been developed. Such improved alloys are listed in Table 1 as DAR2 through DAR19. The alloys have been designed to form metallic glasses at low cooling rates, and are further designed to reduce the number of elements utilized in the alloys.

Ingots of the 19 alloys listed in Table 1 were melt-spun at 15 m/s with the following melt-spinning parameters: chamber ⅓ atmosphere helium, ejection pressure 150 Torr, ejection temperature 1,400° C., crucible up to wheel distance 6 mm, and crucible orifice diameter 0.81 mm to 0.84 mm.

Figure 18:
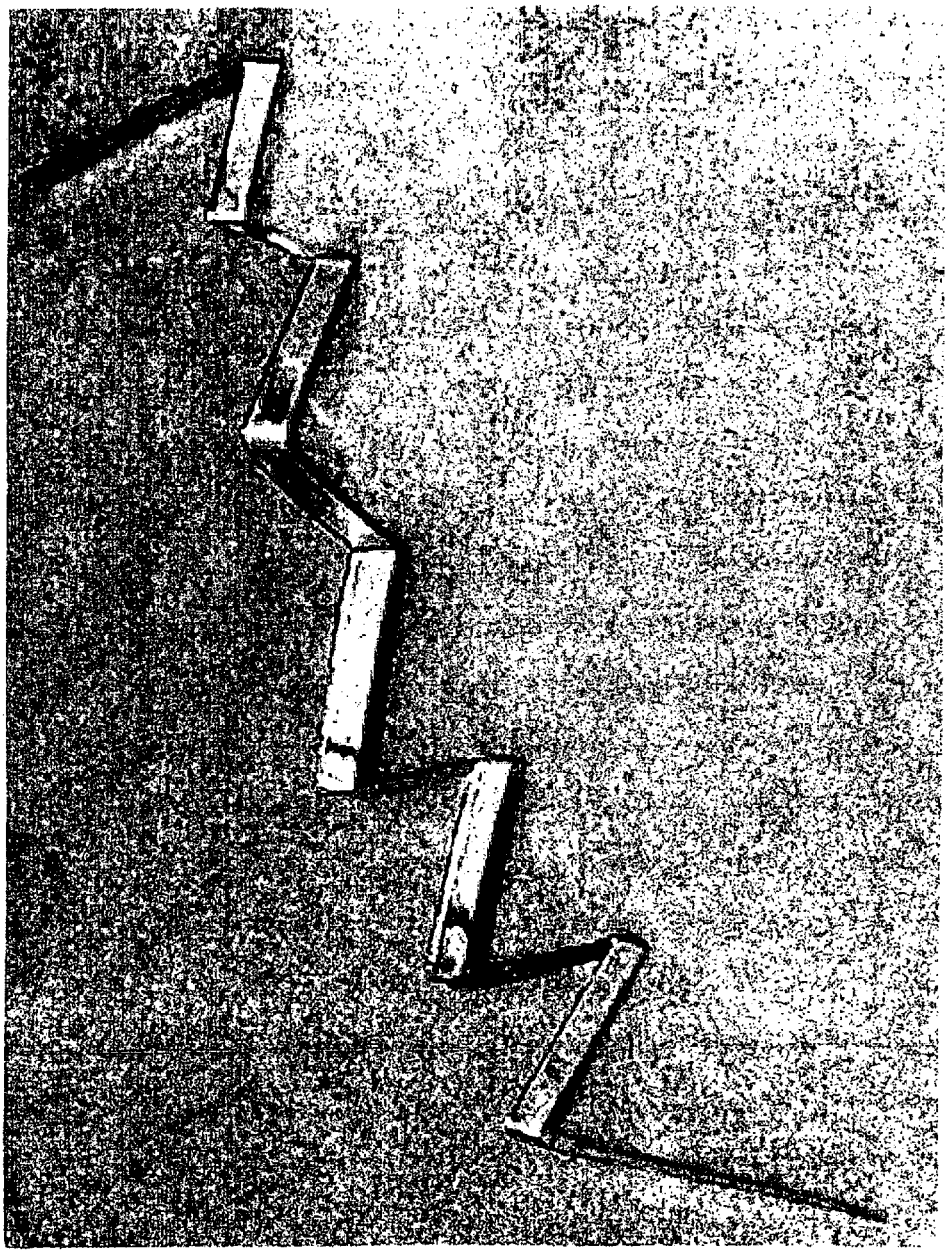
FIG. 18 is an optical micrograph of an as-spun ribbon of $(Fe_{0.8}CR_{0.2})_{81}B_{17}W_2$. The alloy exhibits high ductility, and can be bent severely without fracture.

All of the tested alloys were melt-spun with few problems. Interestingly, many of the preferred alloys (i.e., DAR2 through DAR19) formed uniform continuous ribbons up to 10 meters in length. This may be due to increased glass forming ability and increased ductility of the glass that is produced relative to the less preferred alloy DAR1. Qualitative inspections of the ribbons by bending the ribbons back and forth until fracture indicated that all of the alloys DAR2 through DAR19 have higher ductility than the DAR1 alloy. In fact, some of the alloys DAR2 through DAR 19 in ribbon-form cannot be broken by bending, and had to be cut. An example of a melt-spun ribbon which exhibits high ductility is shown in FIG. 18, and was formed from the material DAR18 $(Fe_{0.8}Cr_{0.2})_{81}B_{17}W_2$.

Figure 19:
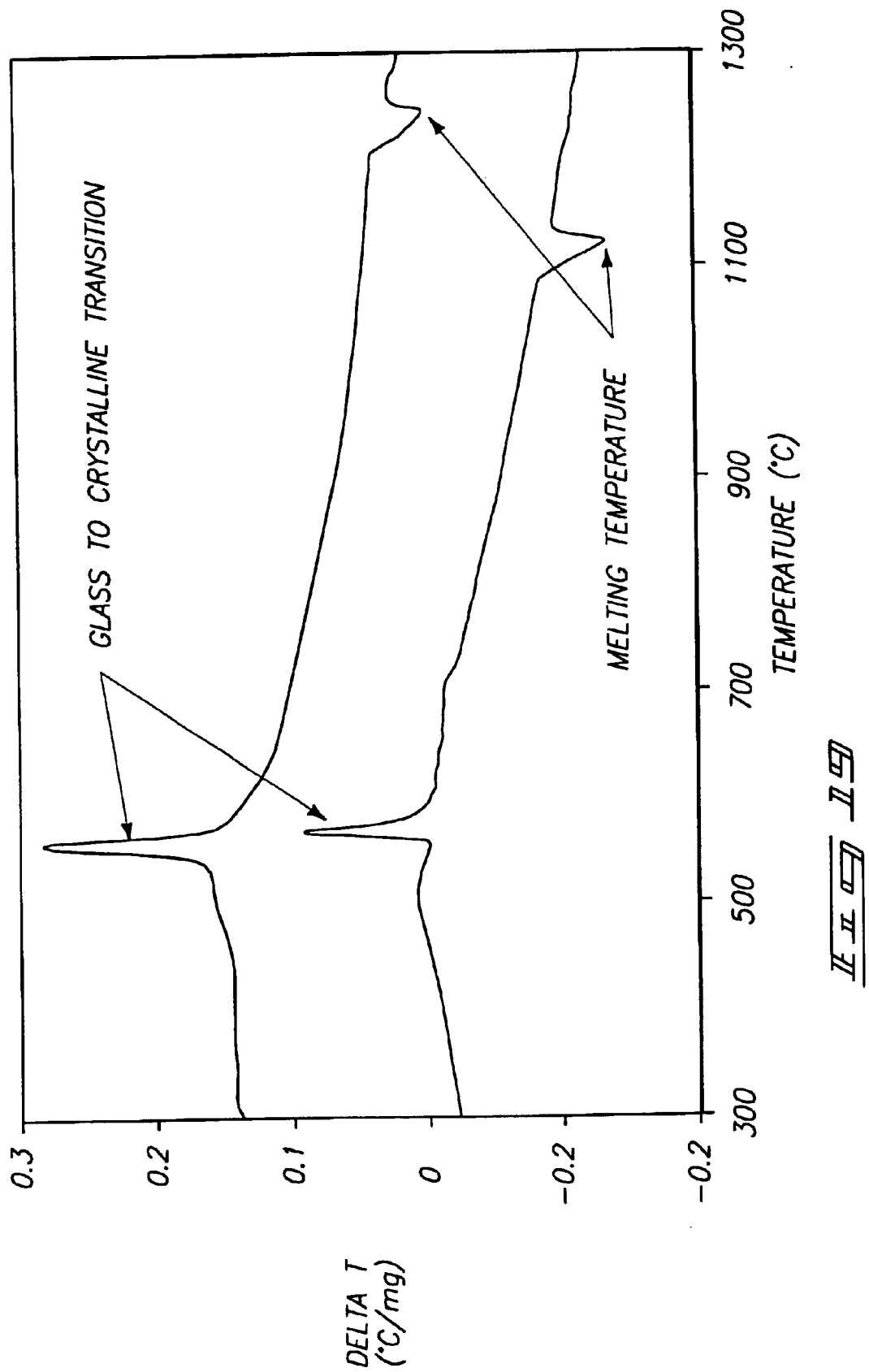
FIG. 19 illustrates data obtained from differential thermal analysis of $(Fe_{0.8}Cr_{0.2})_{75}B_{17}Si_4Al_4$ (top graph) and $Fe_{63}Cr_8Mo_2B_{17}C_5Si_1Al_4$ (lower graph). The graph curves show glass to crystalline transitions and melting temperatures for the tested alloys.
Figure 20:
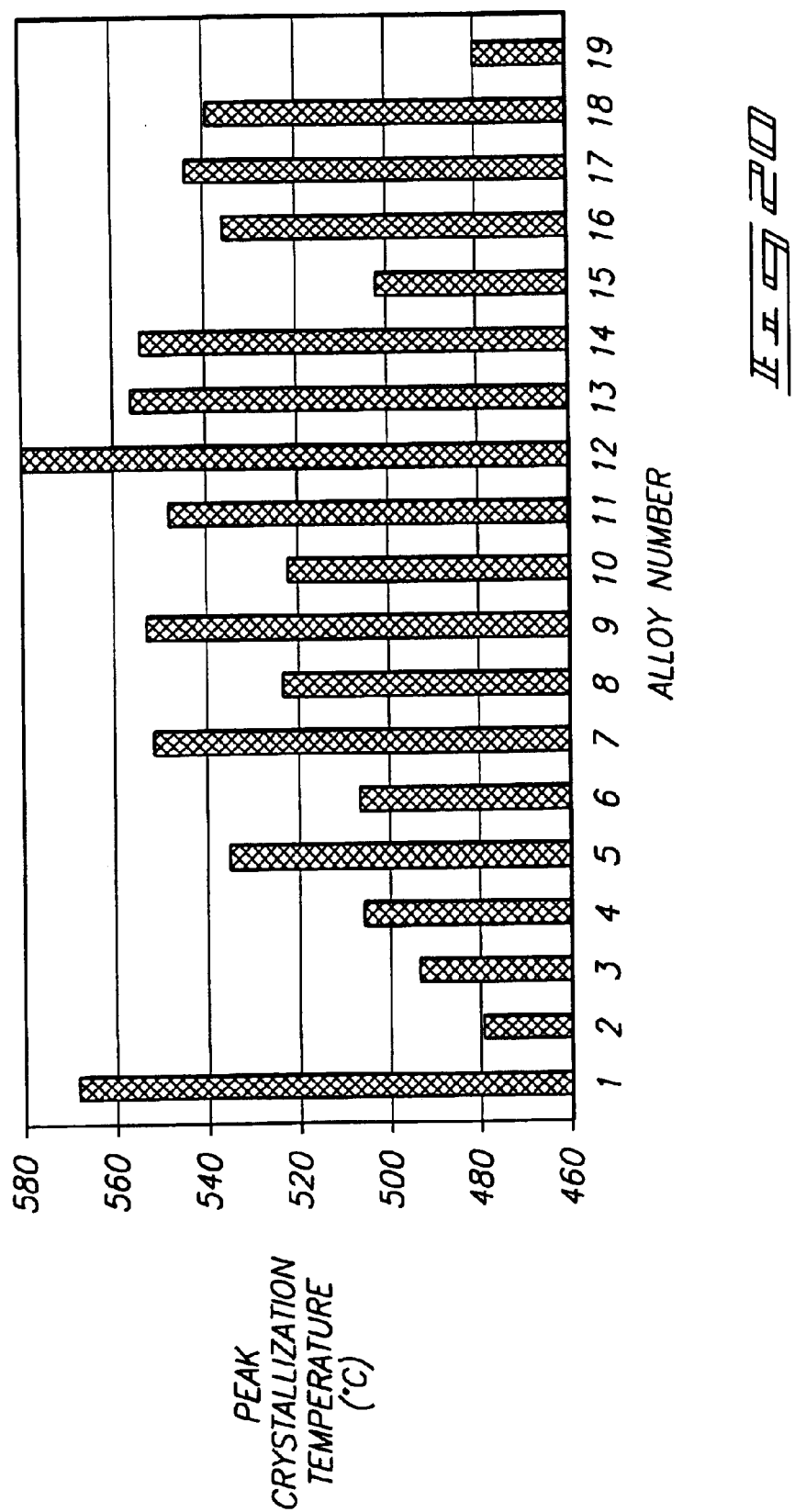
FIG. 20 shows peak crystallization temperatures measured by differential thermal analysis for a variety of alloys. Specifically.
Figure 11:
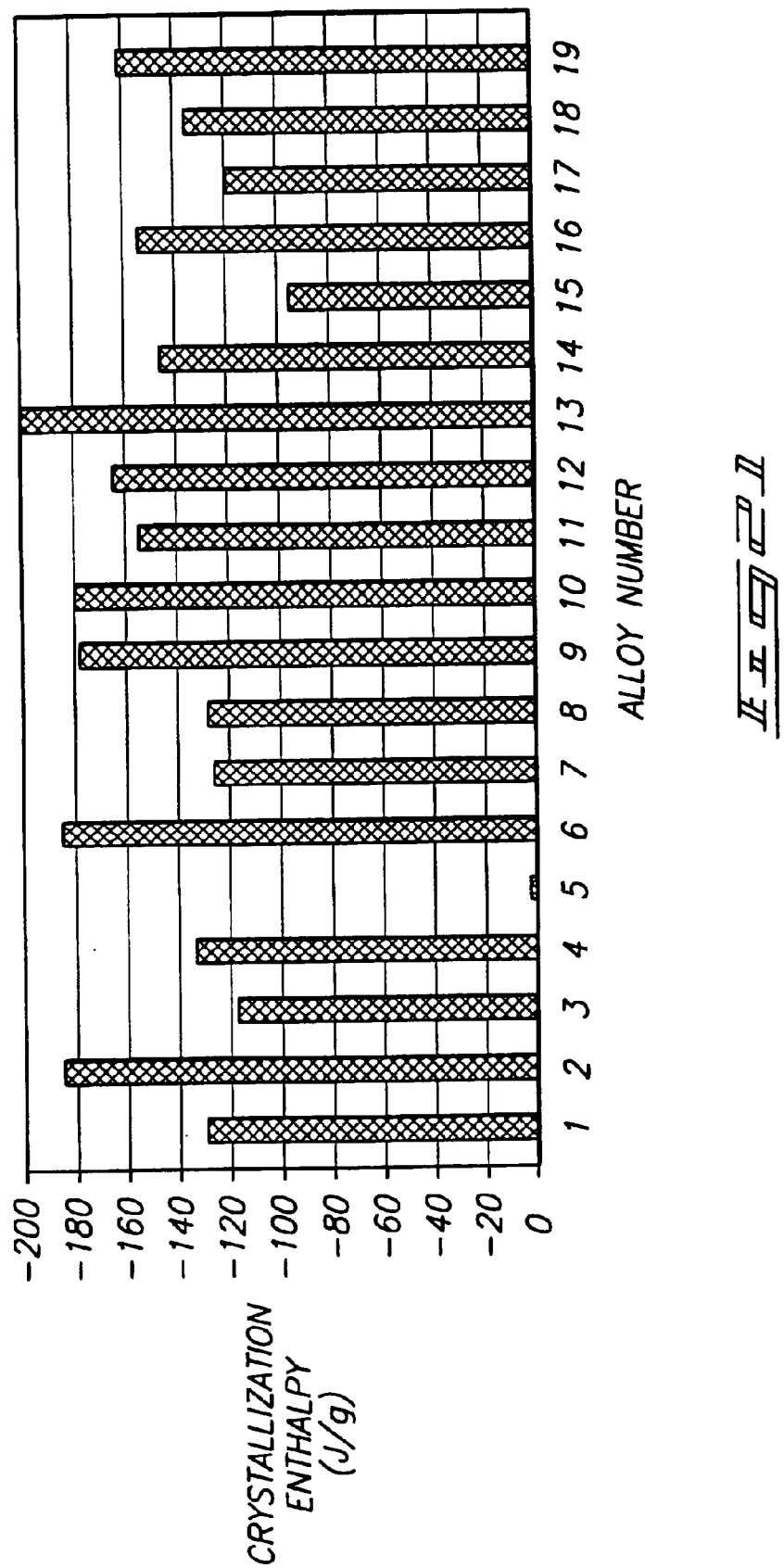
Figure 22:
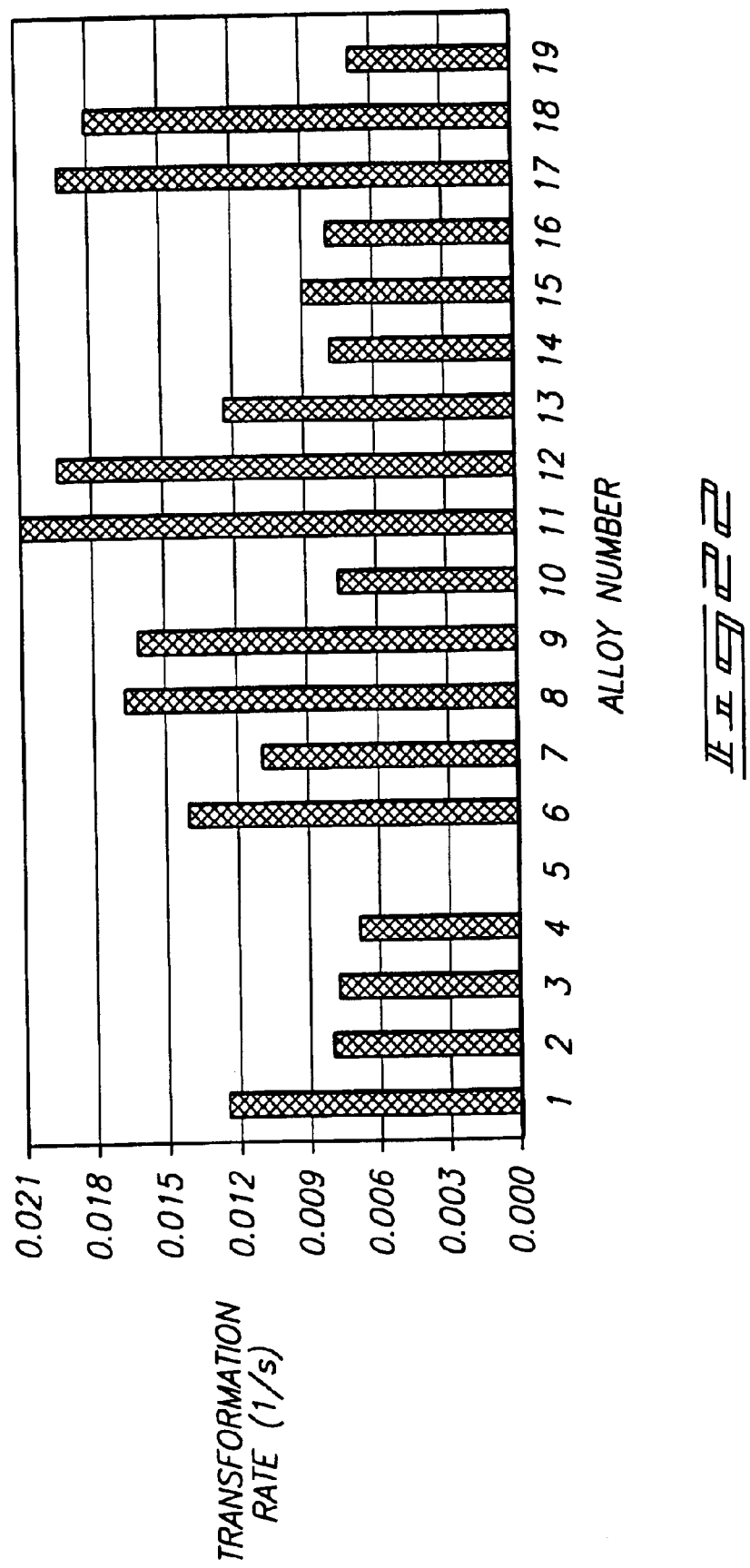
FIG. 22 illustrates a graph of transformation rates of glass to crystallization transformation for various alloys encompassed by the present invention. Specifically.
Figure 23:
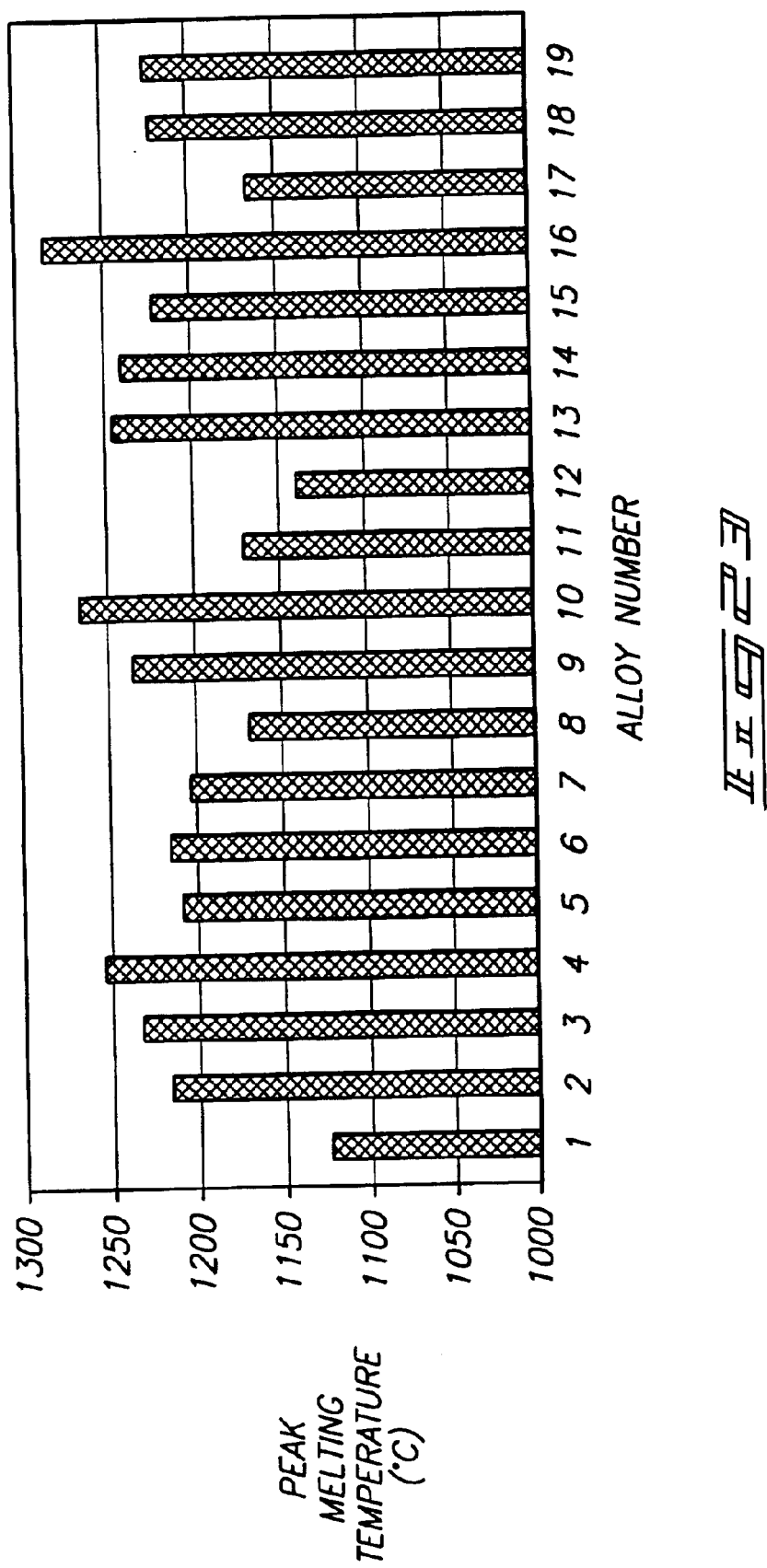
FIG. 23 illustrates peak melting temperatures measured by differential thermal analysis for various alloys encompassed by the present invention. Specifically.

Differential thermal analysis (DTA) and differential thermal calorimetry (DSC) studies were done on each melt-spun ribbon sample in ultra-high purity argon from 30° C. to 1,375° C. at a heating rate of 10° C./min. A typical DTA scan showing DAR14 $((Fe_{0.8}Cr_{0.2})_{75}B_{17}Si_4Al_4)$ compared with DAR1 $(Fe_{63}Cr_8Mo_2B_{17}C_5Si_1Al_4)$ is illustrated in FIG. 19. From the DTA/DSC studies, the glass to crystalline transformation temperatures, enthalpy of transformation, transformation rate, and melting temperatures could be determined. The results of these studies are shown in FIGS. 20–23. As shown, all of the alloys but one (specifically, DAR5 $((Fe_{0.8}Mo_{0.2})_{83}B_{17})$, formed a metallic glass structure when melt-spun at reduced cooling rate. Thus, the alloys are expected to form metallic glass powders when atomized.

Vickers hardness testing using a 100 gram load was done on the cross-sections of the melt-spun ribbons of each alloy in the as-spun and heat-treated (700° C. for one hour and 800° C. for one hour) conditions. For each sample (60 samples total), 10 Vickers hardness tests on five ribbons were done in order to get a reportable average value. In general, only small variations were found to occur in hardness when the same sample was tested. Summaries of the completed Vickers hardness measurements are shown in Table 4.

TABLE 4

| ALLOY | Condition | Hardness (kg/mm$^2$) | Hardness (GPa) |
|---|---|---|---|
| $(Fe_{0.85}Cr_{0.15})_{83}B_{17}$ | As-Spun | 996 | 9.77 |
| $(Fe_{0.85}Cr_{0.15})_{83}B_{17}$ | 700° C. | 835 | 8.19 |
| $(Fe_{0.85}Cr_{0.15})_{83}B_{17}$ | 800° C. | 864 | 8.47 |
| $(Fe_{0.8}Cr_{0.2})_{83}B_{17}$ | As-Spun | 1048 | 10.28 |
| $(Fe_{0.8}Cr_{0.2})_{83}B_{17}$ | 700° C. | 935 | 9.17 |
| $(Fe_{0.8}Cr_{0.2})_{83}B_{17}$ | 800° C. | 870 | 8.53 |
| $(Fe_{0.75}Cr_{0.25})_{83}B_{17}$ | As-Spun | 1065 | 10.45 |
| $(Fe_{0.75}Cr_{0.25})_{83}B_{17}$ | 700° C. | 1011 | 9.91 |
| $(Fe_{0.75}Cr_{0.25})_{83}B_{17}$ | 800° C. | 888 | 8.71 |
| $(Fe_{0.6}Co_{0.2}Cr_{0.2})_{83}B_{17}$ | As-Spun | 980 | 9.61 |
| $(Fe_{0.6}Co_{0.2}Cr_{0.2})_{83}B_{17}$ | 700° C. | 1119 | 10.97 |
| $(Fe_{0.6}Co_{0.2}Cr_{0.2})_{83}B_{17}$ | 800° C. | 984 | 9.65 |
| $(Fe_{0.8}Cr_{0.15}Mo_{0.05})_{83}B_{17}$ | As-Spun | 1062 | 10.41 |
| $(Fe_{0.8}Cr_{0.15}Mo_{0.05})_{83}B_{17}$ | 700° C. | 1573 | 15.43 |
| $(Fe_{0.8}Cr_{0.15}Mo_{0.05})_{83}B_{17}$ | 800° C. | 900 | 8.83 |
| $(Fe_{0.8}Cr_{0.2})_{79}B_{17}C_4$ | As-Spun | 1103 | 10.82 |
| $(Fe_{0.8}Cr_{0.2})_{79}B_{17}C_4$ | 700° C. | 1317 | 12.91 |
| $(Fe_{0.8}Cr_{0.2})_{79}B_{17}C_4$ | 800° C. | 1194 | 11.71 |
| $(Fe_{0.8}Cr_{0.2})_{79}B_{17}Si_4$ | As-Spun | 1096 | 10.75 |
| $(Fe_{0.8}Cr_{0.2})_{79}B_{17}Si_4$ | 700° C. | 1150 | 11.28 |
| $(Fe_{0.8}Cr_{0.2})_{79}B_{17}Si_4$ | 800° C. | 885 | 8.67 |
| $(Fe_{0.8}Cr_{0.2})_{79}B_{17}Al_4$ | As-Spun | 1053 | 10.32 |
| $(Fe_{0.8}Cr_{0.2})_{79}B_{17}Al_4$ | 700° C. | 1119 | 10.97 |
| $(Fe_{0.8}Cr_{0.2})_{79}B_{17}Al_4$ | 800° C. | 946 | 9.28 |
| $(Fe_{0.8}Cr_{0.2})_{75}B_{17}Al_4C_4$ | As-Spun | 1098 | 10.76 |

TABLE 4-continued

| ALLOY | Condition | Hardness (kg/mm$^2$) | Hardness (GPa) |
|---|---|---|---|
| $(Fe_{0.8}Cr_{0.2})_{75}B_{17}Al_4C_4$ | 700° C. | 1380 | 13.53 |
| $(Fe_{0.8}Cr_{0.2})_{75}B_{17}Al_4C_4$ | 800° C. | 1159 | 11.37 |
| $(Fe_{0.8}Cr_{0.2})_{75}B_{17}Si_4C_4$ | As-Spun | 1184 | 11.61 |
| $(Fe_{0.8}Cr_{0.2})_{75}B_{17}Si_4C_4$ | 700° C. | 1509 | 14.80 |
| $(Fe_{0.8}Cr_{0.2})_{75}B_{17}Si_4C_4$ | 800° C. | 1245 | 12.21 |
| $(Fe_{0.8}Cr_{0.2})_{75}B_{17}Si_4Al_4$ | As-Spun | 1063 | 10.42 |
| $(Fe_{0.8}Cr_{0.2})_{75}B_{17}Si_4Al_4$ | 700° C. | 1266 | 12.42 |
| $(Fe_{0.8}Cr_{0.2})_{75}B_{17}Si_4Al_4$ | 800° C. | 1055 | 10.34 |
| $(Fe_{0.8}Cr_{0.2})_{71}B_{17}Si_4C_4Al_4$ | As-Spun | 1093 | 10.72 |
| $(Fe_{0.8}Cr_{0.2})_{71}B_{17}Si_4C_4Al_4$ | 700° C. | 1376 | 13.49 |
| $(Fe_{0.8}Cr_{0.2})_{71}B_{17}Si_4C_4Al_4$ | 800° C. | 1134 | 11.12 |
| $(Fe_{0.7}Co_{0.1}Cr_{0.2})_{83}B_{17}$ | As-Spun | 1042 | 10.22 |
| $(Fe_{0.7}Co_{0.1}Cr_{0.2})_{83}B_{17}$ | 700° C. | 1135 | 11.13 |
| $(Fe_{0.7}Co_{0.1}Cr_{0.2})_{83}B_{17}$ | 800° C. | 885 | 8.68 |
| $(Fe_{0.8}Cr_{0.2})_{80}B_{20}$ | As-Spun | 1093 | 10.72 |
| $(Fe_{0.8}Cr_{0.2})_{80}B_{20}$ | 700° C. | 1045 | 10.24 |
| $(Fe_{0.8}Cr_{0.2})_{80}B_{20}$ | 800° C. | 965 | 9.47 |
| $(Fe_{0.8}Cr_{0.2})_{76}B_{17}Al_7$ | As-Spun | 1028 | 10.08 |
| $(Fe_{0.8}Cr_{0.2})_{76}B_{17}Al_7$ | 700° C. | 1441 | 14.13 |
| $(Fe_{0.8}Cr_{0.2})_{76}B_{17}Al_7$ | 800° C. | 868 | 8.51 |
| $(Fe_{0.8}Cr_{0.2})_{79}B_{17}W_2C_2$ | As-Spun | 1124 | 11.02 |
| $(Fe_{0.8}Cr_{0.2})_{79}B_{17}W_2C_2$ | 700° C. | 1653 | 16.21 |
| $(Fe_{0.8}Cr_{0.2})_{79}B_{17}W_2C_2$ | 800° C. | 1223 | 11.99 |
| $(Fe_{0.8}Cr_{0.2})_{81}B_{17}W_2$ | As-Spun | 1052 | 10.31 |
| $(Fe_{0.8}Cr_{0.2})_{81}B_{17}W_2$ | 700° C. | 1565 | 15.34 |
| $(Fe_{0.8}Cr_{0.2})_{81}B_{17}W_2$ | 800° C. | 1100 | 10.79 |

As indicated by the tables and Figures provided herein, materials of the present invention having less than 11 elements, and more preferably less than seven elements, can form glass compositions. It is not a trivial task to form materials having such limited number of elements, which are also capable of forming metallic glasses. However, such has been accomplished in the present invention. The present invention also has developed improved ductility and toughness of DNC steel alloys, while maintaining or possibly even improving hardness. The DNC alloys are believed to be useful for numerous services, including military applications, due to their strength and wear resistance. The alloys can also be resistant to electrochemical attack (i.e., corrosion). In general, as the scale of a microstructure decreases, the electrochemical resistance of a articular material is expected to increase. Thus, nanocrystalline scale DNC microstructures are expected to have good corrosion resistance. Further, metallic glass DNC structures can have improved corrosion resistance due to high homogeneity (short range order on a 2 nanometer length scale) and the absence of two-dimensional defects (such as grain or phase boundaries). Specifically, a uniform single-phase structure can make it difficult for sites to initiate for anodic attack and electron transfer since there will not be distinct anodic and cathodic sites. While the metallic glass or nanostructure of a certain composition can have a higher relative resistance to electrochemical attack than the same material in bulk form, the material's nobility will be dependent on both the structure and the composition. For instance, a high level of chromium can improve resistance to electrochemical attack.

Among the advantages of the alloys described herein is that such alloys can have a relatively simple composition (i.e., from four to six elements in the composition). Also, the alloys can contain a relatively high percentage of transition metals (from 90% to 97%) which can lead to improved industrial properties of the materials.

A distinction of the materials of the present invention relative to conventional hard materials is that the materials of the present invention can comprise no carbon. In conventional steels, hardness is typically tied directly to carbon content in a martensite. In contrast, the extreme hardness of DNC steels arises from development of nanoscale nanocomposite microstructures, rather than from martensitic transformations. An advantage of carbon-free compositions is that the extremely hard alloys can be developed to still be reasonably ductile, which is typically not possible in conventional steel alloys (i.e., untempered martensite and transition metal carbides are typically hard, and also brittle).

Group VI transition metals (Cr, Mo, and W) can be particularly potent additions to DNC steels. Chromium, consistent with data on conventional steel alloys, is expected to also provide excellent corrosion resistance. Molybdenum and tungsten can be exceptionally potent additions to promote hardness in DNC steels. Tungsten can also be potent at increasing hardness while retaining or increasing ductility.

Because of its hardness and high strength (greater than 725 ksi), DNC steel can be difficult to process into bulk parts starting from powder and using conventional powder metallurgical consolidation processes. However, DNC steel can be easy to process from the liquid state. Alternatively, powder of DNC steel can be fed through a conventional plasma gun and sprayed as a coating onto metal substrates with good adhesion and with absence of cracking. Other methods for forming a coating of DNC steel include axial feed plasma spray, conventional plasma spray, high velocity oxy-fuel spray, and a detonation gun.

When DNC steel is sprayed onto metallic substrates it can readily form a metallic glass structure. If consecutive layers are continuously sprayed onto a bulk substrate (thickness greater than 0.1 inches) metallic glasses can be formed. This may be the most inexpensive and easiest way to form bulk metallic glass coatings or even bulk glass monolithic parts.

DNC steels can be rapidly solidified into an amorphous glass precursor and then the rapidly solidified powders can be consolidated into a useful form. Accordingly, the cost of technology of the present invention can involve three items: the alloy cost, the powder production cost, and the consolidation cost. All three items can be estimated. To produce rapidly solidified powder, centrifugal atomization may be the best method, and even at relatively low production rates. If it is feasible to produce DNC steel powder by water atomization, processing cost to produce the powder could drop to a few pennies per pound. The powder consolidation costs will vary depending on the specific application and the thickness of the coating. Coatings from 5 micrometers to 2,500 micrometers in thickness can be readily deposited using conventional commercially available thermal deposition methods, such as plasma spraying or high velocity oxy-fuel spraying. The DNC steel's cost can compare favorably to other hard materials such as, for example, diamond and cubic BN. DNC steel coating may also be a direct competing technology to replace tungsten carbide cemented carbide coatings, since the DNC steel exhibits higher hardness and greater tensile ductility.

Although the invention is described herein for coating steel alloy compositions of the present invention on metallic substrates, it is to be understood that the alloys of the present invention can also be coated on non-metallic substrates, such as, for example, ceramics, to provide a hard and/or lubricating surface over the non-metallic substrates.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method of forming a hardened surface on a substrate, comprising:

providing a substrate; and forming a molten alloy and cooling said alloy to form a metallic glass coating on the substrate, the forming comprising forming a successive buildup of metallic glass layers, the metallic glass coating having a hardness of at least about 9.2 GPa, and comprising an alloy containing fewer than 11 elements and wherein said alloy contains one or both of molybdenum and tungsten.

2. A method of forming a hardened surface on a substrate, comprising:

providing a substrate;

forming a molten alloy and cooling said alloy to form a metallic glass coating on the substrate and having a first hardness of at least about 9.2 GPa, the metallic glass comprising fewer than 11 elements; and converting at least a portion of the metallic glass coating to a crystalline material having a nanocrystalline grain size and a second hardness of at least about 9.2 GPa.

3. The method of claim 1 wherein the substrate is a metallic material.

4. The method of claim 1 wherein the substrate is a ceramic material.

5. The method of claim 2 wherein the first hardness is at least about 10.0 GPa.

6. The method of claim 1 wherein the metallic glass comprises fewer than 7 elements.

7. The method of claim 1 wherein the metallic glass coating is applied to the substrate as a plasma spray.

8. The method of claim 1 wherein the forming the metallic glass coating comprises an application of an atomized powder of a metallic glass material over the substrate.

9. The method of claim 2 wherein the forming a metallic glass coating comprises forming a successive buildup of continuous layers.

10. The method of claim 2 wherein the converting comprises heating the metallic glass to above a crystallization temperature of the metallic glass.

11. The method of claim 10 wherein the heating comprises heating to a temperature of at least about 600° C. and below a melting temperature of the metallic glass.

12. The method of claim 2 wherein the second hardness is at least about 10.0 GPa.

13. A method of forming a hardened surface on a substrate, comprising:

providing a substrate;

forming a molten alloy and cooling said alloy to form a metallic glass coating on the substrate; the forming comprising a successive build-up of metallic glass layers, the metallic glass comprising one or more materials selected from the group consisting of $(Fe_{0.85}Cr_{0.15})_{83}B_{17}$, $(Fe_{0.8}Cr_{0.2})_{83}B_{17}$, $(Fe_{0.75}Cr_{0.25})_{83}B_{17}$, $(Fe_{0.6}Co_{0.2}Cr_{0.2})_{83}B_{17}$, $(Fe_{0.8}Cr_{0.15}Mo_{0.05})_{83}B_{17}$, $(Fe_{0.8}Cr_{0.2})_{79}B_{17}C_4$, $(Fe_{0.8}Cr_{0.2})_{79}B_{17}Si_4$, $(Fe_{0.8}Cr_{0.2})_{79}B_{17}Al_4$, $(Fe_{0.8}Cr_{0.2})_{75}B_{17}Al_4C_4$, $(Fe_{0.8}Cr_{0.2})_{75}B_{17}Si_4C_4$, $(Fe_{0.8}Cr_{0.2})_{75}B_{17}Si_4Al_4$, $(Fe_{0.8}Cr_{0.2})_{71}B_{17}Si_4C_4Al_4$, $(Fe_{0.7}Co_{0.1}Cr_{0.2})_{83}B_{17}$, $(Fe_{0.8}Cr_{0.2})_{80}B_{20}$, $(Fe_{0.8}Cr_{0.2})_{76}B_{17}Al_7$, $(Fe_{0.8}Cr_{0.2})_{79}B_{17}W_2C_2$, $(Fe_{0.8}Cr_{0.2})_{81}B_{17}W_2$, and $Fe_{64}Ti_3Cr_5Mo_2B_{16}C_5Si_1Al_2La_2$; the metallic glass coating having a hardness of at least about 9.2 GPa and converting at least a portion of the metallic glass coating to a crystalline material having a nanocrystalline grain size.

14. The method of claim 13 wherein the metallic glass coating is applied to the substrate by a plasma spray system.

15. The method of claim 13 wherein the forming the metallic glass coating comprises an application of an atomized powder of a metallic glass material over the substrate.

16. The method of claim 13 wherein the metallic glass coating comprises $(Fe_{0.85}Cr_{0.15})_{83}B_{17}$.

17. The method of claim 13 wherein the metallic glass coating consists essentially of $(Fe_{0.85}Cr_{0.15})_{83}B_{17}$.

18. The method of claim 13 wherein the metallic glass coating consists of $(Fe_{0.85}Cr_{0.15})_{83}B_{17}$.

19. The method of claim 13 wherein the metallic glass coating comprises $(Fe_{0.8}Cr_{0.2})_{83}B_{17}$.

20. The method of claim 13 wherein the metallic glass coating consists essentially of $(Fe_{0.8}Cr_{0.2})_{83}B_{17}$.

21. The method of claim 13 wherein the metallic glass coating consists of $(Fe_{0.8}Cr_{0.2})_{83}B_{17}$.

22. The method of claim 13 wherein the metallic glass coating comprises $(Fe_{0.75}Cr_{0.25})_{83}B_{17}$.

23. The method of claim 13 wherein the metallic glass coating consists essentially of $(Fe_{0.75}Cr_{0.25})_{83}B_{17}$.

24. The method of claim 13 wherein the metallic glass coating consists of $(Fe_{0.75}Cr_{0.25})_{83}B_{17}$.

25. The method of claim 13 wherein the metallic glass coating comprises $(Fe_{0.6}Co_{0.2}Cr_{0.2})_{83}B_{17}$.

26. The method of claim 13 wherein the metallic glass coating consists essentially of $(Fe_{0.6}Co_{0.2}Cr_{0.2})_{83}B_{17}$.

27. The method of claim 13 wherein the metallic glass coating consists of $(Fe_{0.6}Co_{0.2}Cr_{0.2})_{83}B_{17}$.

28. The method of claim 13 wherein the metallic glass coating of comprises $(Fe_{0.8}Cr_{0.15}Mo_{0.05})_{83}B_{17}$.

29. The method of claim 13 wherein the metallic glass coating consists essentially of $(Fe_{0.8}Cr_{0.15}Mo_{0.05})_{83}B_{17}$.

30. The method of claim 13 wherein the metallic glass coating consists of $(Fe_{0.8}Cr_{0.15}Mo_{0.05})_{83}B_{17}$.

31. The method of claim 13 wherein the metallic glass coating comprises $(Fe_{0.8}Cr_{0.2})_{79}B_{17}C_4$.

32. The method of claim 13 wherein the metallic glass coating consists essentially of $(Fe_{0.8}Cr_{0.2})_{79}B_{17}C_4$.

33. The method of claim 13 wherein the metallic glass coating consists of $(Fe_{0.8}Cr_{0.2})_{79}B_{17}C_4$.

34. The method of claim 13 wherein the metallic glass coating comprises $(Fe_{0.8}Cr_{0.2})_{79}B_{17}Si_4$.

35. The method of claim 13 wherein the metallic glass coating consists essentially of $(Fe_{0.8}Cr_{0.2})_{79}B_{17}Si_4$.

36. The method of claim 13 wherein the metallic glass coating consists of $(Fe_{0.8}Cr_{0.2})_{79}B_{17}Si_4$.

37. The method of claim 13 wherein the metallic glass coating comprises $(Fe_{0.8}Cr_{0.2})_{79}B_{17}Al_4$.

38. The method of claim 13 wherein the metallic glass coating consists essentially of $(Fe_{0.8}Cr_{0.2})_{79}B_{17}Al_4$.

39. The method of claim 13 wherein the metallic glass coating consists of $(Fe_{0.8}Cr_{0.2})_{79}B_{17}Al_4$.

40. The method of claim 13 wherein the metallic glass coating comprises $(Fe_{0.8}Cr_{0.2})_{75}B_{17}Al_4C_4$.

41. The method of claim 13 wherein the metallic glass coating consists essentially of $(Fe_{0.8}Cr_{0.2})_{75}B_{17}Al_4C_4$.

42. The method of claim 13 wherein the metallic glass coating consists of $(Fe_{0.8}Cr_{0.2})_{75}B_{17}Al_4C_4$.

43. The method of claim 13 wherein the metallic glass coating comprises $(Fe_{0.8}Cr_{0.2})_{75}B_{17}Si_4C_4$.

44. The method of claim 13 wherein the metallic glass coating consists essentially of $(Fe_{0.8}Cr_{0.2})_{75}B_{17}Si_4C_4$.

45. The method of claim 13 wherein the metallic glass coating consists of $(Fe_{0.8}Cr_{0.2})_{75}B_{17}Si_4C_4$.

46. The method of claim 13 wherein the metallic glass coating comprises $(Fe_{0.8}Cr_{0.2})_{75}B_{17}Si_4Al_4$.

47. The method of claim 13 wherein the metallic glass coating consists essentially of $(Fe_{0.8}Cr_{0.2})_{75}B_{17}Si_4Al_4$.

48. The method of claim 13 wherein the metallic glass coating consists of $(Fe_{0.8}Cr_{0.2})_{75}B_{17}Si_4Al_4$.

49. The method of claim 13 wherein the metallic glass coating comprises $(Fe_{0.8}Cr_{0.2})_{71}B_{17}Si_4C_4Al_4$.

50. The method of claim 13 wherein the metallic glass coating consists essentially of $(Fe_{0.8}Cr_{0.2})_{71}B_{17}Si_4C_4Al_4$.

51. The method of claim 13 wherein the metallic glass coating consists of $(Fe_{0.8}Cr_{0.2})_{71}B_{17}Si_4C_4Al_4$.

52. The method of claim 13 wherein the metallic glass coating comprises $(Fe_{0.7}Co_{0.1}Cr_{0.2})_{83}B_{17}$.

53. The method of claim 13 wherein the metallic glass coating consists essentially of $(Fe_{0.7}Co_{0.1}Cr_{0.2})_{83}B_{17}$.

54. The method of claim 13 wherein the metallic glass coating consists of $(Fe_{0.7}Co_{0.1}Cr_{0.2})_{83}B_{17}$.

55. The method of claim 13 wherein the metallic glass coating comprises $(Fe_{0.8}Cr_{0.2})_{80}B_{20}$.

56. The method of claim 13 wherein the metallic glass coating consists essentially of $(Fe_{0.8}Cr_{0.2})_{80}B_{20}$.

57. The method of claim 13 wherein the metallic glass coating consists of $(Fe_{0.8}Cr_{0.2})_{80}B_{20}$.

58. The method of claim 13 wherein the metallic glass coating comprises $(Fe_{0.8}Cr_{0.2})_{76}B_{17}Al_7$.

59. The method of claim 13 wherein the metallic glass coating of claim 13 consists essentially of $(Fe_{0.8}Cr_{0.2})_{76}B_{17}Al_7$.

60. The method of claim 13 wherein the metallic glass coating consists of $(Fe_{0.8}Cr_{0.2})_{76}B_{17}Al_7$.

61. The method of claim 13 wherein the metallic glass coating comprises $(Fe_{0.8}Cr_{0.2})_{79}B_{17}W_2C_2$.

62. The method of claim 13 wherein the metallic glass coating consists essentially of $(Fe_{0.8}Cr_{0.2})_{79}B_{17}W_2C_2$.

63. The method of claim 13 wherein the metallic glass coating of claim 13 consists of $(Fe_{0.8}Cr_{0.2})_{79}B_{17}W_2C_2$.

64. The method of claim 13 wherein the metallic glass coating of claim 13 comprises $(Fe_{0.8}Cr_{0.2})_{81}B_{17}W_2$.

65. The method of claim 13 wherein the metallic glass coating consists essentially of $(Fe_{0.8}Cr_{0.2})_{81}B_{17}W_2$.

66. The method of claim 13 wherein the metallic glass coating of claim 13 consists of $(Fe_{0.8}Cr_{0.2})_{81}B_{17}W_2$.

67. The method of claim 13 wherein the metallic glass coating of claim 13 comprises $Fe_{64}Ti_3Cr_5Mo_2B_{16}C_5Si_1Al_2La_2$.

68. The method of claim 13 wherein the metallic glass coating consists essentially $Fe_{64}Ti_3Cr_5Mo_2B_{16}C_5Si_1Al_2La_2$.

69. The method of claim 13 wherein the metallic glass coating of claim 13 consist of $Fe_{64}Ti_3Cr_5Mo_2B_{16}C_5Si_1Al_2La_2$.

* * * * *